(12) United States Patent
Waki et al.

(10) Patent No.: US 6,888,577 B2
(45) Date of Patent: May 3, 2005

(54) IMAGE COMPOSITING DEVICE, RECORDING MEDIUM, AND PROGRAM

(75) Inventors: Yasushi Waki, Kyoto-fu (JP); Takakazu Shiomi, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 390 days.

(21) Appl. No.: 09/937,240

(22) PCT Filed: Jan. 24, 2001

(86) PCT No.: PCT/JP01/00462
§ 371 (c)(1),
(2), (4) Date: Sep. 21, 2001

(87) PCT Pub. No.: WO01/54400
PCT Pub. Date: Jul. 26, 2001

(65) Prior Publication Data
US 2002/0171765 A1 Nov. 21, 2002

(30) Foreign Application Priority Data
Jan. 24, 2000 (JP) ......................................... 2000-14493

(51) Int. Cl.⁷ .............................................. H04N 9/74
(52) U.S. Cl. ...................... 348/589; 348/584; 348/597; 348/600
(58) Field of Search ................................ 348/584, 597, 348/586, 589, 600, 590, 591, 592, 593, 598; 345/660, 634, 561; H04N 9/74

(56) References Cited

U.S. PATENT DOCUMENTS

| | | | |
|---|---|---|---|
| 5,351,067 A | * | 9/1994 | Lumelsky et al. ........... 345/561 |
| 5,825,433 A | | 10/1998 | Yamada et al. |
| 5,912,710 A | * | 6/1999 | Fujimoto ..................... 348/445 |
| 6,208,354 B1 | * | 3/2001 | Porter ......................... 345/634 |
| 6,359,657 B1 | * | 3/2002 | Westerink et al. .......... 348/584 |
| 6,362,854 B1 | * | 3/2002 | Fierke et al. ............... 348/584 |
| 6,621,932 B2 | * | 9/2003 | Hagai et al. ................ 382/233 |
| 6,661,427 B1 | * | 12/2003 | MacInnis et al. ........... 345/660 |

FOREIGN PATENT DOCUMENTS

| | | |
|---|---|---|
| EP | 0 716 541 | 6/1996 |
| JP | 8-163437 | 6/1996 |
| JP | 2000-194354 | 7/2000 |

* cited by examiner

Primary Examiner—John Miller
Assistant Examiner—Trang U. Tran

(57) ABSTRACT

An image compositing apparatus of the present invention composites a video image and a plurality of graphical images together into a final composite image. The image compositing apparatus includes a first obtaining unit, a first compositing unit, a calculating unit, a second obtaining unit, and a second compositing unit. The first obtaining unit obtains the graphical images and composition information that includes an image compositing order and is used for calculating the composition ratios of the images to the final composite image. The first compositing unit composites the graphical images together into one composite graphical image according to the composition information. The calculating unit calculates the composition ratio of the video image to the final composite image according to the composition information. The second obtaining unit obtains frames of the video image. The second compositing unit composites the frames with the composite graphical image using the composition ratio of the video image.

10 Claims, 30 Drawing Sheets

$R_N, G_N, B_N, \alpha_N$ $R_2, G_2, B_2, \alpha_2$ $R_1, G_1, B_1, \alpha_1$ $R_0, G_0, B_0, \alpha_0$

FIG.13

```
1       R=0 ;
2       G=0 ;
3       B=0 ;
4       α=0 ;
5       for (i=0 ; i<=N ; i++) {
6          if (VIDEO=component i) {
7                   R=(1− α i)*R ;
8                   G=(1− α i)*G ;
9                   B=(1− α i)*B ;
10                  α = α i ;
11         } else {
12                  R= α i*Ri+(1− α i)*R ;
13                  G= α i*Gi+(1− α i)*G ;
14                  B= α i*Bi+(1− α i)*B ;
15                  α = α *(1− α i) ;
16         }
17      }
18      R=R+ α *Rv ;
19      G=G+ α *Gv ;
20      B=B+ α *Bv ;
```

FIG.14

```
[program 1]
1          R=0 ;
2          G=0 ;
3          B=0 ;
4          α =0 ;
5          for (i=0 ; i<=N ; i++) {
6              if (VIDEO=component i) {
7                  R=(1− α i)*R ;
8                  G=(1− α i)*G ;
9                  B=(1− α i)*B ;
10                 α = α i ;
11             } else {
12                 R= α i*Ri+(1− α i)*R ;
13                 G= α i*Gi+(1− α i)*G ;
14                 B= α i*Bi+(1− α i)*B ;
15                 α = α *(1− α i) ;
16             }
17         }
[program 2]
1          while(true) {
2              R=R+ α *Rv ;
3              G=G+ α *Gv ;
4              B=B+ α *Bv ;
5          }
```

FIG.25

| operation type | operation |
|---|---|
| CLEAR | $R=0, G=0, B=0$ |
| SRC | $R=\alpha_i \cdot R_i, G=\alpha_i \cdot G_i, B=\alpha_i \cdot B_i$ |
| SRC_OVER | $R=\alpha_i \cdot R_i+(1-\alpha_i) \cdot R, G=\alpha_i \cdot G_i+(1-\alpha_i) \cdot G,$ $B=\alpha_i \cdot B_i+(1-\alpha_i) \cdot B$ |
| DST_OVER | $R=R+(1-\alpha) \cdot \alpha_i \cdot R_i, G=G+(1-\alpha) \cdot \alpha_i \cdot G_i,$ $B=B+(1-\alpha) \cdot \alpha_i \cdot B_i$ |
| SRC_IN | $R=\alpha \cdot \alpha_i \cdot R_i, G=\alpha \cdot \alpha_i \cdot G_i, B=\alpha \cdot \alpha_i \cdot B_i$ |
| DST_IN | $R=\alpha_i \cdot R, G=\alpha_i \cdot G, B=\alpha_i \cdot B$ |
| SRC_OUT | $R=(1-\alpha) \cdot \alpha_i \cdot R_i, G=(1-\alpha) \cdot \alpha_i \cdot G_i,$ $B=(1-\alpha) \cdot \alpha_i \cdot B_i$ |
| DST_OUT | $R=(1-\alpha_i) \cdot R, G=(1-\alpha_i) \cdot G, B=(1-\alpha_i) \cdot B$ |

FIG.26

| operation type | operation |
|---|---|
| CLEAR | $R=0, G=0, B=0$ |
| SRC | $R=0, G=0, B=0$ |
| SRC_OVER | $R=(1-\alpha_i) \cdot R, G=(1-\alpha_i) \cdot G, B=(1-\alpha_i) \cdot B$ |
| DST_OVER | $R=R, G=G, B=B$ |
| SRC_IN | $R=0, G=0, B=0$ |
| DST_IN | $R=\alpha_i \cdot R, G=\alpha_i \cdot G, B=\alpha_i \cdot B$ |
| SRC_OUT | $R=0, G=0, B=0$ |
| DST_OUT | $R=(1-\alpha_i) \cdot R, G=(1-\alpha_i) \cdot G, B=(1-\alpha_i) \cdot B$ |

FIG.27

| operation type | operation |
|---|---|
| CLEAR | $\alpha = 0$ |
| SRC | $\alpha = \alpha_i$ |
| SRC_OVER | $\alpha = \alpha_i + (1 - \alpha_i) \cdot \alpha$ |
| DST_OVER | $\alpha = \alpha + (1 - \alpha) \cdot \alpha_i$ |
| SRC_IN | $\alpha = \alpha \cdot \alpha_i$ |
| DST_IN | $\alpha = \alpha \cdot \alpha_i$ |
| SRC_OUT | $\alpha = (1 - \alpha) \cdot \alpha_i$ |
| DST_OUT | $\alpha = (1 - \alpha_i) \cdot \alpha$ |

FIG.29

| operation type | operation |
|---|---|
| CLEAR | $\alpha = 0$ |
| SRC | $\alpha = 0$ |
| SRC_OVER | $\alpha = \alpha \cdot (1 - \alpha_i)$ |
| DST_OVER | $\alpha = \alpha$ |
| SRC_IN | $\alpha = 0$ |
| DST_IN | $\alpha = \alpha \cdot \alpha_i$ |
| SRC_OUT | $\alpha = 0$ |
| DST_OUT | $\alpha = (1 - \alpha_i) \cdot \alpha$ |

FIG.30

| operation type | operation |
|---|---|
| CLEAR | $\alpha = 0$ |
| SRC | $\alpha = \alpha_i$ |
| SRC_OVER | $\alpha = \alpha_i$ |
| DST_OVER | $\alpha = \alpha_i \cdot (1 - \alpha_{osd})$ |
| SRC_IN | $\alpha = \alpha_i \cdot \alpha_{osd}$ |
| DST_IN | $\alpha = 0$ |
| SRC_OUT | $\alpha = (1 - \alpha_{osd}) \cdot \alpha_i$ |
| DST_OUT | $\alpha = 0$ |

FIG.31

```
1       R=0 ;
2       G=0 ;
3       B=0 ;
4       α =0 ;
5       α v=0 ;
6       for (i=0 ; i<=N ; i++) {
7           if (VIDEO=component i) {
8               R,G,B update A
9               α v update A
10          } else {
11              R,G,B update B
12              α v update B
13          }
14          α update
15      }
16      R=R+ α v*Rv ;
17      G=G+ α v*Gv ;
18      B=B+ α v*Bv ;
```

IMAGE COMPOSITING DEVICE, RECORDING MEDIUM, AND PROGRAM

TECHNICAL FIELD

The present invention relates to an image compositing apparatus for compositing a plurality of images to output a final image.

BACKGROUND ART

Recently digital broadcasting has started. In the digital TV set used for the digital broadcasting, graphical images are generated according to data from a broadcasting station and the generated graphical images are overlaid on video images of a program when displayed.

For this purpose, the digital TV set is equipped with an image compositing apparatus.

The image compositing apparatus performs a predetermined operation between pixels for images F and G to output an image H. In the inter-pixel operation, a pixel f(x,y) of the image F and a pixel g(x,y), which corresponds to the pixel f(x,y), of the image G are used to generate a pixel h(x,y) of the image H.

One method of the inter-pixel operation is the α blending algorithm. In the α blending algorithm, the weighted average of the pixels f(x,y) and g(x,y) is the pixel h(x,y). Suppose that the weighting factor for the pixel g(x,y) is "α", the α blending algorithm is given below.

$$h(x,y) = \alpha * g(x,y) + (1-\alpha) * f(x,y)$$

where, "*" indicates multiplication
Equation Group 1

In this equation, the weighting factor is referred to as an "αvalue", a "transparency", a "blending factor" or the like. The value of the weighting factor is "0" to "1".

When the α value is "0", the pixel g(x,y) is completely transparent and the pixel f(x, y) as it is becomes the combined pixel h(x,y). On the other hand, when the α value is "1", the pixel g(x,y) is completely opaque and the pixel g(x,y) as it becomes the pixel h(x,y). When the a value is "0.5", the pixel h(x,y) is a composite of 50% of the pixel g(x,y) and 50% of the pixel f(x,y). In this manner, the α value indicates how an image is overlaid on another image. In the actual hardware, each pixel is represented by RGB (Red, Green, and Blue) color components, so that the arithmetic operation indicated above is performed for each of the components.

For compositing graphical images and video images together in real time, the image compositing apparatus includes an OSD (On Screen Display) plane, which is a memory area for developing graphical images, and a video plane, which is another memory area for developing video images in frame units. Whenever a frame on the video plane is updated, images in the two areas are composited together according to the α blending algorithm to output a composite image. FIG. 1A is a conceptual diagram showing how images on an OSD plane 2501 and a video plane 2502 are composited together to output a composite image 2503.

Meanwhile, the recent digital broadcasting requires to overlay a plurality of graphical images 2511, 2513, 2514, and 2515, which indicate the title and TV programs and the like, on a video image 2512 of a program while the video image 2512 is reproduced as shown in FIG. 1B.

Theoretically, it is enough to perform the a blending algorithm for images to be composited together in turn from the bottom to the top in order to composite a video image and a plurality of graphical images together. Actually, however, a large amount of arithmetic operations is performed for the α blending algorithm for a plurality of images, so that it is extremely difficult to composite a plurality of images in real time whenever a frame of video images is updated.

Images can be composited at high speed by providing the planes that correspond to the images and a plurality of pieces of hardware that perform the a blending algorithm and that also correspond to the images. In this case, however, hardware cost is raised. Also, many planes are needed. This is problematic.

DISCLOSURE OF THE INVENTION

It is accordingly an object of the present invention to provide an image compositing apparatus that composites images together in real time according to the reproduction rate of video images, i.e., at high speed.

Another object of the present invention is to provide an image compositing apparatus with fewer memories for image development.

The above-mentioned first and second objects may be achieved by an image compositing apparatus that composites images together into a final composite image, the images including a video image and a plurality of graphical images, the image compositing apparatus including: a first obtaining unit that obtains the graphical images and composition information including an image compositing order, the composition information being used for calculating a composition ratio of each of the images to the final composite image; a first compositing unit that composites the graphical images to generate one composite graphical image according to the composition information; a calculating unit that calculates a composition ratio of the video image to the final composite image according to the composition information; a second obtaining unit that obtains frames of the video image; and a second compositing unit that composites one of the obtained frames at a time with the composite graphical image using the composition ratio of the video image.

In this image compositing apparatus, the graphical images are composited together and the composition ratio of the video image is calculated before the frames of the video image are composited with the composite graphical image. Accordingly, it is not necessary to composite a plurality of graphical images with a video image for each of the frames unlike the conventional manner. As a result, the calculation is performed under light load and the processing speed is increased. Due to the higher processing speed, images are composited and a final composite image is displayed in real time according to the reproduction rate of the video image. Accordingly, the capacity of the frame buffer for developing video image frames can be decreased. This is effective.

The first and second objects may be also achieved by the composition information further including: coefficients, each of which corresponds to a different one of the images; and arithmetic information which has blending algorithms which each correspond to the images, the blending algorithms using the coefficients.

In this image compositing apparatus, a plurality of graphical images and a video image can be composited together for which the coefficients and arithmetic information have been defined. This is also effective.

The first and second objects may be also achieved by a structure in which the image compositing apparatus further includes a first frame buffer that stores images, and a second frame buffer that stores frames of the video image, wherein the first compositing unit reads the graphical images obtained by the first obtaining unit, according to the image compositing order, composites each of the read graphical images with a storage content of the first frame buffer using the coefficients and the arithmetic information, and replaces the storage content of the first buffer with a result of compositing one of the read graphical images with the storage content, the second obtaining unit stores the obtained frames in the second buffer, and the second compositing unit composites each of the frames stored in the second buffer with an image in the first frame buffer using the composition ratio of the video image.

In this image compositing apparatus, a plurality of graphical images and video image can be composited together only with two frame buffers, i.e., the first and second frame buffers.

The first and second objects may be also achieved by the image compositing having a structure in which the first compositing unit performs a blending algorithm on the image in the first frame buffer using a coefficient and arithmetic information corresponding to the video image after compositing a graphical image immediately preceding the video image in the compositing order and before compositing a graphical image immediately succeeding the video image with the storage content, and replaces the content of the first frame buffer with a result of the blending algorithm.

In this image compositing apparatus, a plurality of graphical images and video image can be composited together with accurate composition ratios even if the video image is positioned between graphical images.

The first and second objects may be also achieved by the image compositing further including a display screen, wherein the first compositing unit generates the composite graphical image, the second obtaining unit obtains the frames, and the second compositing unit composites the frames with the composite graphical image in parallel with each other.

In this image compositing apparatus, a state of the images in the compositing process is displayed on the display screen. As a result, a situation in which nothing is displayed on the display screen until the completion of the image compositing can be prevented.

The first and second objects may be also achieved by the composition information further including a composition coefficient for each of the images, each composition coefficient indicating a composition ratio of one of the images to a composite of the image with at least another one of the images.

In this image compositing apparatus, a plurality of graphical images and a video image can be composited together for which the compositing order and composition ratios to the composite of any images among the images have been defined.

The first and second objects may be also achieved by a structure in which the image compositing order indicates a first overlaying order of the images, the composition coefficients are $\alpha$ values, each of which indicates a composition ratio of one of the images to a composite of the image with images below the image in the first overlaying order, and the calculating unit calculates the composition ratio of the video image to the final composite image from $\alpha$ values of the video image and images above the video image in the first overlaying order.

In this image compositing apparatus, still and video images can be composited together for which the $\alpha$ values and the compositing order have been defined. The layout of images for which the $\alpha$ values have been defined can be more flexibly changed compared with images for which the composition ratios to the final composite image have been defined. This is an advantage. Accordingly, the image compositing apparatus that composites images using $\alpha$ values can deal with a variety of EPG display layouts.

The first and second objects may be also achieved by the image compositing apparatus further including a switching unit for switching two adjacent images in the first overlaying order to rearrange the images in a second overlaying order; and an updating unit for updating $\alpha$ values of the switched two adjacent images so that results of compositing in the first and second overlaying orders are the same, wherein the first compositing unit generates the composite graphical image, the calculating unit calculates the composition ratio of the video image to the final composite image, and the second compositing unit composites the frames with the composite graphical image using the second overlaying order and the updated $\alpha$ values.

In this image compositing apparatus, a plurality of images can be composited together even if the order of the image is changed.

Also, when the order is changed so that a video image in the middle of the order is positioned at the uppermost in the image compositing apparatus, the plurality of graphical images can be composited together in turn in the bottom-to-top order and the video image can be composited with the composite graphical image. Accordingly, the amount of calculation is decreased and the calculation is performed under light load.

The first and second objects may be also achieved by the image compositing apparatus having a structure which further includes a storage unit for storing a plurality of graphical images that are obtained by the first obtaining unit, wherein the graphical images are each made up of (A) image data which has pixels, a number of which is no larger than pixels of the final composite image and (B) layout information which indicates a layout of the images on the final composite image, and the first compositing unit generates the composite graphical image, the calculating unit calculates the composition ratio of the video image to the final composite image, and the second compositing unit composites the frames with the composite graphical image for an overlapping part of the images that is determined by the layout information.

The first and second objects may be also achieved by the image compositing apparatus having a structure which further comprises a storage unit for storing the plurality of graphical images obtained by the first obtaining unit; the plurality of graphical images are represented by vector data; and the first compositing unit generates the composite graphical image after converting the vector data to the pixels.

In this image compositing apparatus, the data of graphical images are vector data, which has less amount of data than pixel data. Accordingly, the memory capacity can be further decreased.

The first and second objects may be also achieved by an image compositing apparatus that composites images together into a final composite image, the images including a plurality of video images and a plurality of graphical images, the image compositing apparatus including: a first obtaining unit that obtains the graphical images and composition information including an image compositing order, the composition information being used for calculating a composition ratio of each of the images to the final composite image; a first compositing unit that composites the graphical images to generate one composite graphical image according to the composition information; a calculating unit that calculates composition ratios of the video images to the final composite image according to the composition information; a second obtaining unit that obtains frames of the video images one frame at a time; and a second compositing unit that composites, each time one frame is obtained, the obtained frame with the composite graphical image using the composition ratios of the video images.

In this image compositing apparatus, a plurality of video images and a plurality of graphical images can be composited together with less amount of calculation and the calculation can be performed under light load.

The first and second objects may be also achieved by an image compositing apparatus that composites images together into a final composite image, the images including a video image and a plurality of graphical images, the image composition apparatus including: a first obtaining unit that obtains the graphical images; a first compositing unit that composites the graphical images to generate one composite graphical image; a second obtaining unit that obtains frames of the video image; and a second compositing unit that composites one of the obtained frames at a time with the composite graphical image.

It is not necessary for this image compositing apparatus to include the same number of memories as the number of graphical images that have the same number of pixels as the display screen. Accordingly, the memory capacity can be decreased.

Also, a plurality of graphical images are composited together before compositing a video image with the composite graphical image. Accordingly, it is not necessary to composite graphical images with a video image for each of the frames. As a result, the amount of calculation can be decreased and the calculation can be performed under light load.

BRIEF DESCRIPTION OF THE DRAWINGS

FIG. 13 shows a program for the arithmetic operations in the first embodiment of the present invention written in the form of the C language;

FIG. 14 shows a modification of the program in FIG. 13;

FIG. 25 shows Porter-Duff rules according to the operation types;

FIG. 26 shows Porter-Duff rules according to the operation types;

FIG. 27 shows Porter-Duff rules according to the operation types;

FIG. 29 shows Porter-Duff rules according to the operation types;

FIG. 30 Porter-Duff rules according to the operation types; and

FIG. 31 shows a program for the arithmetic operations in the fourth embodiment of the present invention written in the form of the C language.

BEST MODE FOR CARRYING OUT THE INVENTION

Explanations of preferred embodiments of the present invention will be given below with reference to figures.

The First Embodiment

<Structure>

Figure 1A:
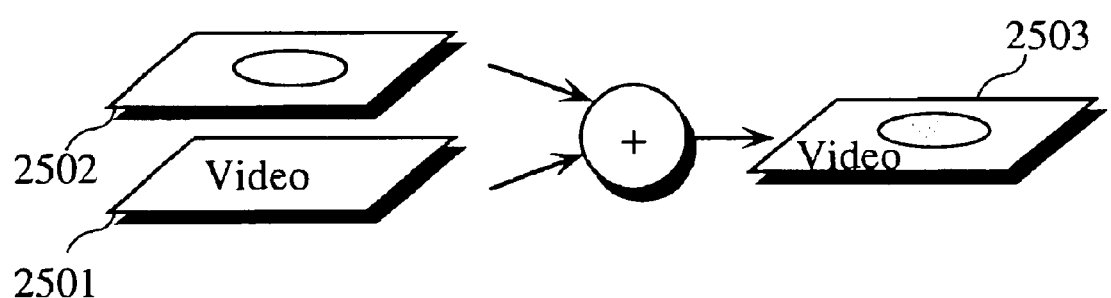
FIG. 1A is a conceptual diagram showing how images on an OSD plane 2501 and a video plane 2502 are composited together to output a composite image 2503.
Figure 1B:
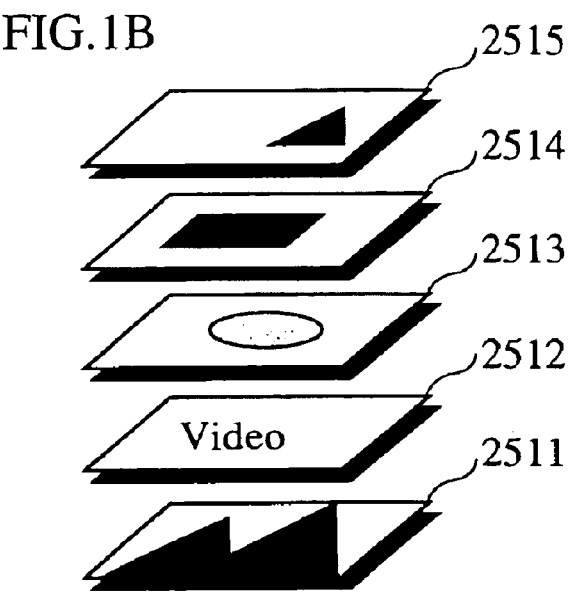
FIG. 1B shows how still and video image components are overlaid on each another.
Figure 2:
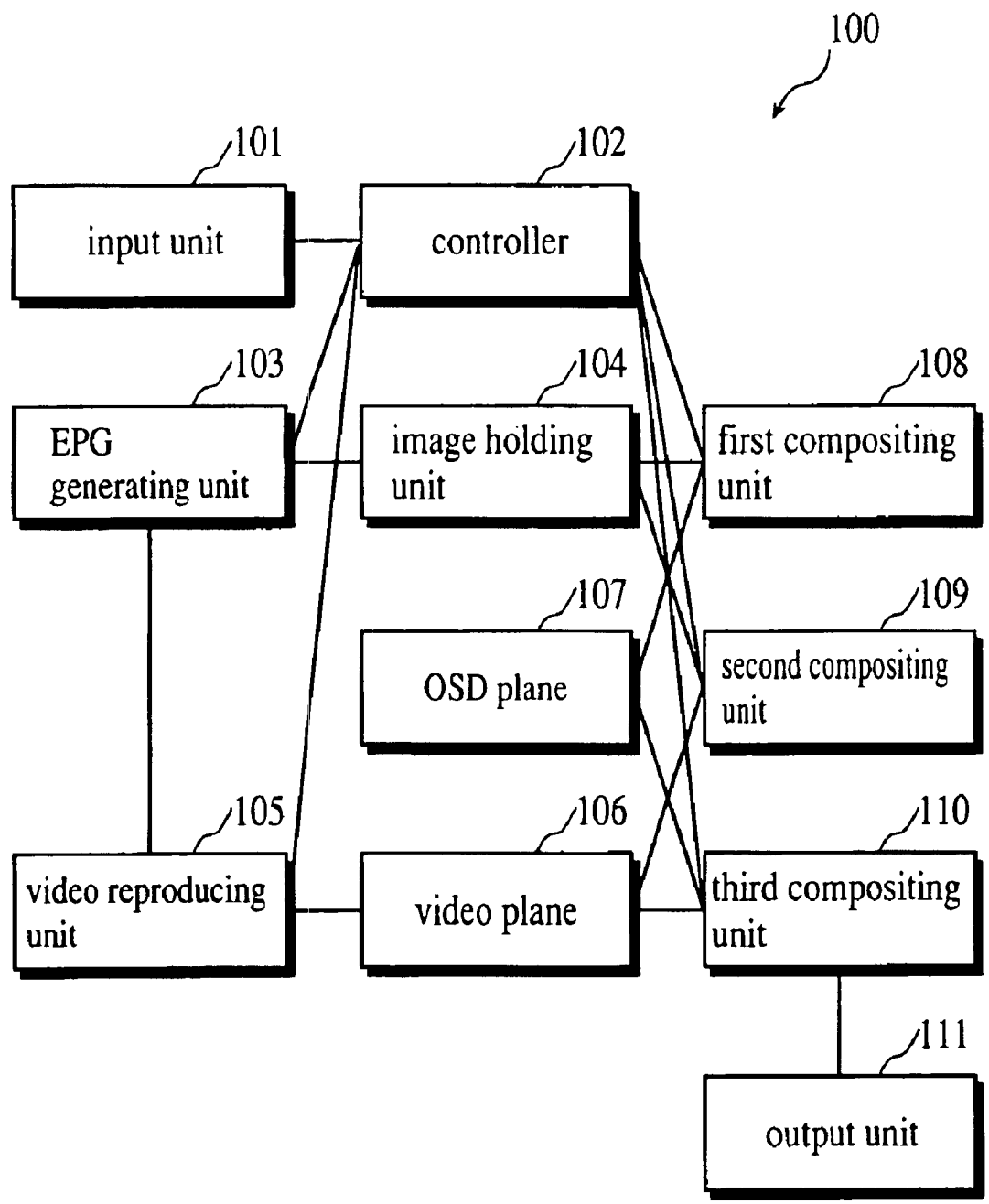
FIG. 2 is a block diagram showing the structure of an image compositing apparatus according to the first embodiment of the present invention.

FIG. 2 is a block diagram showing the structure of an image compositing apparatus according to the first embodiment of the present invention.

In FIG. 2, an image compositing apparatus 100 includes an input unit 101, a controller 102, an EPG generating unit 103, an image holding unit 104, a video reproducing unit 105, a video plane 106, an OSD plane 107, a first compositing unit 108, a second compositing unit 109, a third compositing unit 110, and an output unit 111.

The input unit 101 includes a remote controller and front panel buttons. Using the remote controller and the front panel buttons, the user inputs instructions. More specifically, the user inputs instructions to turn the image compositing apparatus 100 ON and OFF, to switch channels, and to turn the EPG (Electronic Program Guide) display ON and OFF.

Here, the "EPG" indicates a system for displaying program tables, information on the program contents, and the like on the TV screen. Also, the "EPG display" indicates the condition in which a program table, for instance, is displayed on the TV screen. The EPG can be applied to searching for programs on the EPG display screen by a genre or a cast. Also, an EPG-compatible VCR can be easily programmed to record.

Figure 3A:
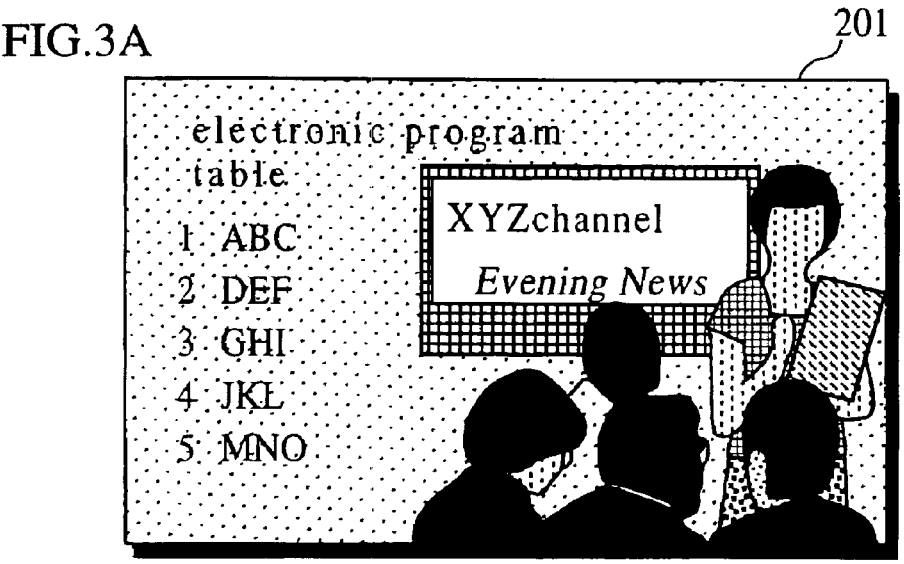
FIG. 3A shows a composite image 201.

When the EPG display is ON, the image compositing apparatus 100 displays a composite image 201 shown in FIG. 3A, for instance.

Figure 3B:
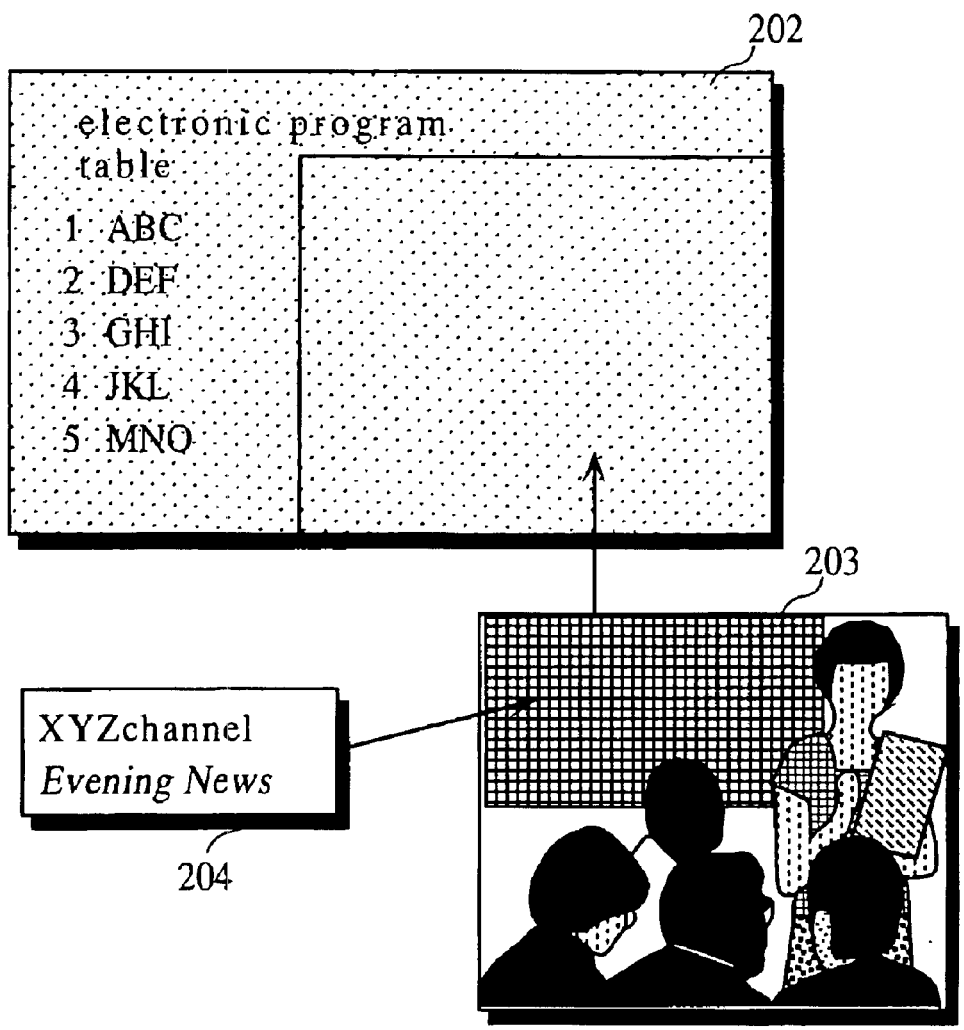
FIG. 3B shows components of the composite image 201.

The composite image 201 in FIG. 3A is composed of components 202, 203, and 204 as shown in FIG. 3B. The component 202 is a graphical image indicating a program table, the component 203 is a video image indicating the content of a program of one channel, and the component 204 is a graphical image indicating the title of the program shown by the component 203. The components 202 and 204 are generated according to the EPG information from the broadcasting station.

As shown in FIGS. 3A and 3B, the image compositing apparatus 100 displays the component 202 while the EPG display is ON. Also, the component 203 is displayed on the bottom right and the component 204 on the upper left of the component 202. The frame rate of a video image of the component 203 is dozens of frames per second.

As has been described, the image compositing apparatus 100 has a function of generating and displaying a composite image from a plurality of components including a plurality of graphical images and one video image.

Here, explanations will be given using FIGS. 3A and 3B as necessary. Note that when not needed to be distinguished from each other, the still and video image components are referred to as just the "component".

The controller 102 controls all the elements of the image compositing apparatus 100. More specifically, when the user instructs to turn the image compositing apparatus 100 ON, the controller 102 has the video reproducing unit 105 reproduce a program. When the user instructs to switch channels, the controller 102 has the video reproducing unit 105 reproduce another program. When the user instructs to turn the EPG display ON, the controller controls the EPG generating unit 103, the video reproducing unit 105, the first compositing unit 108, the second compositing unit 109, and the third compositing unit 110 so as to generate the composite image 201. The processing relating to the EPG display will be described later.

The EPG generating unit 103 obtains and holds the EPG information from the broadcasting station. The EPG information includes layout information on the sizes, positions, and overlaying order of components and graphical image information on graphical image components. The graphical image information, which corresponds to the image contents of graphical image components, includes texts, graphics data and the like. The EPG generating unit 103 generates a plurality of image files and one index file according to the EPG information and stores the image files and index file in the image holding unit 104. Then, the EPG generating unit 103 extracts from the EPG information the size and position of the video image component that is a part of the EPG display screen. The extracted size and position are output to the video reproducing unit 105.

The image files, which correspond to the components 202, 203, and 204, in FIG. 3B, includes the sizes, positions and image data of the components. For the graphical image component, the image data is generated by the EPG generating unit 103 according to the graphical image information.

The index file, which is used for managing the plurality of image files, includes a plurality of pieces of image information. Each piece of image information corresponds to a different image file. The plurality of pieces of image information are arranged in the index file in the same order as the overlaying order of components in FIG. 3A. Each piece of image information includes an image type and a storage position. The image type indicates whether the image of the corresponding image file is a graphical image or a video image. The storage position indicates the position of the beginning of the corresponding image file in the image holding unit 104.

Here, an explanation of a specific example of the image file and index file will be given with reference to FIGS. 4 and 5.

Figure 4:
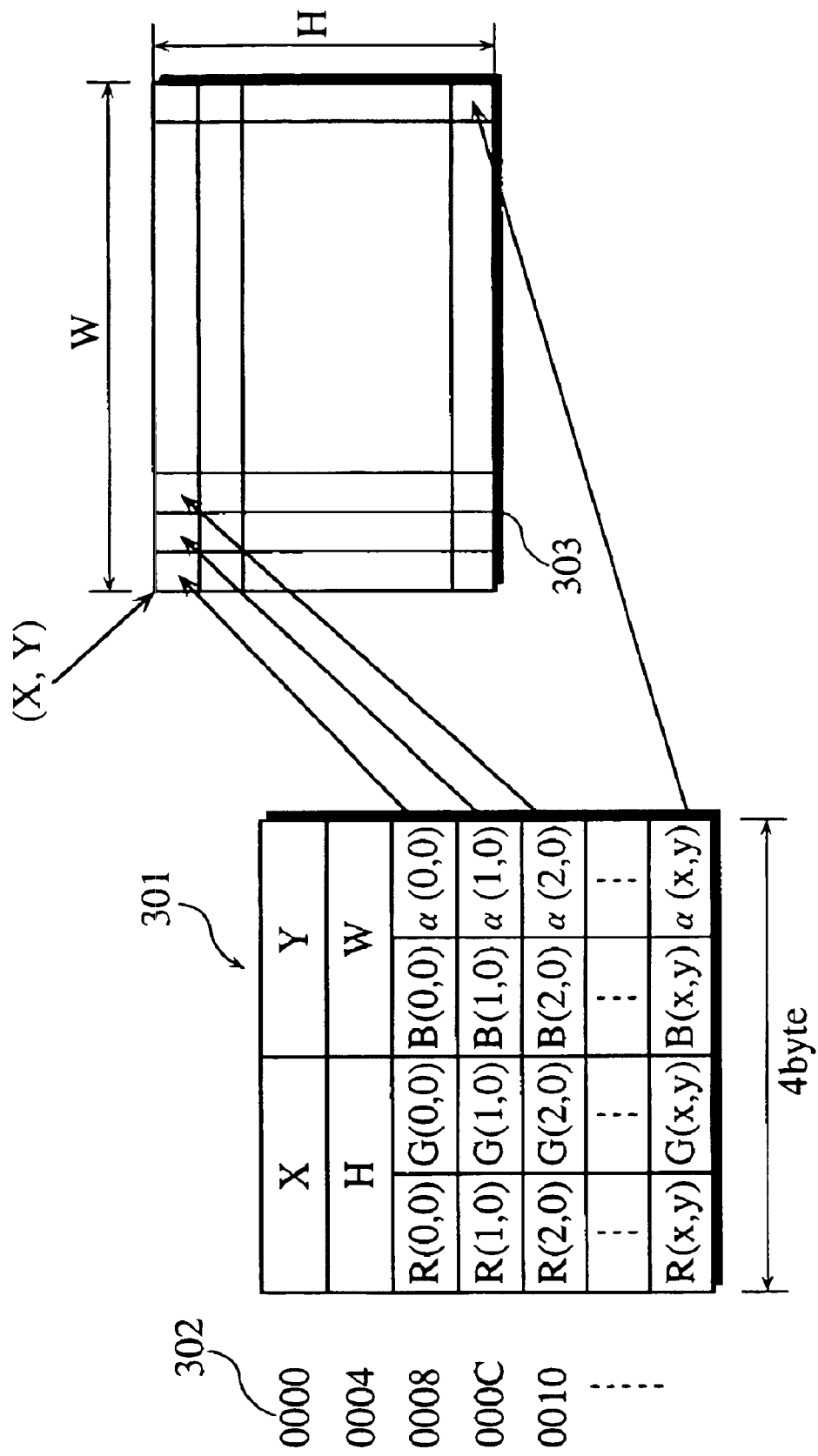
FIG. 4 is a diagram for explaining the structure of an image file.

FIG. 4 is a diagram for explaining the structure of the image file.

In an image file 301 in FIG. 4, the first line indicates the position, the second line the size, and the third and the following lines the image data. The image data is composed of a group of pixel data that correspond to the pixels of the component. Each piece of the pixel data includes RGB components that indicate the color of the pixel and an α value that indicates the transparency of the pixel. Each α value indicates a composition ratio of one of the images to a composite of the image with images below the image in the overlaying order of images. A storage position 302 at the left of the image file 301 indicates the storage position of each piece of the pixel data with reference to the position of the beginning of the image file 301, "0000".

In the image file 301, the third line indicates the pixel data corresponding to the pixel with the coordinates (0,0), the fourth line the pixel data corresponding to the pixel with the coordinates (1,0), and the fifth line the pixel data corresponding to the pixel with the coordinates (2,0). Here, the coordinates (0,0) are located at the upper left corner of the component. In this way, each piece of the pixel data corresponds to a different pixel in the left-to-right and top-to-bottom order.

The position indicates the coordinates of the component in the composite image 201. The position is represented by the x and y coordinates of the upper left corner of the component by taking the upper left corner of the composite image 201 as the origin.

The size indicates the height "H" and the width "W" of the rectangular component. The height "H" and width "W" are each represented in pixel units.

Each of the RGB components is represented by a value from "0" to "255". When the three components are all "0", the pixel color is black and when "255", white.

The α value, which is represented by a value from "0" to "255", indicates the transparency when the pixel is overlaid on another pixel, i.e., how degree the lower pixel passes through the upper pixel.

More specifically, when a pixel "A" is combined with a pixel "B" with the α value, a combined pixel "C" is $(\alpha A+(255-\alpha)B)/255$. Here, the α value is from "0" to "255". When the α value is "0", the pixel "A" is transparent, i.e., 100% of the pixel "B" passes through the pixel "A". On the other hand, when the α value is "255", the pixel "A" is opaque, i.e., the pixel "B" does not pass through the pixel "A". In this case, the combined pixel "C" is the same as the pixel "A". Meanwhile, when the α value is "128", 50% of the pixel "B" passes through the pixel "A", i.e., the combined pixel "C" has the color that is a result of combining 50% of the pixel "A" with 50% of the pixel "B".

Actually, the pixels "A", "B", and "C" are represented by the RGB components. The compositing results are calculated for each of the components.

The EPG generating unit 103 sets the α values of the image file of each of the components 202, 203, and 204 as follows. The EPG generating unit 103 sets the a values of all the pixels of the component 202 at "255". This is because the component 202 is positioned at the lowest layer in the composite image 201. Also, the EPG generating unit 103 sets the α values of all the pixels of the component 203 at "192". For the component 204, the EPG generating unit 103 sets the α values of the pixels corresponding to the characters at "255" and the α values of the remaining pixels at "64".

Note that how to determine the RGB component values and the α values is well known in the art and does not characterize the present invention, so that no more detailed explanation will be given here.

A component 303 in FIG. 4 is a diagram for showing the correspondence between the image data and the component. As shown in FIG. 4, each piece of the pixel data corresponds to a different pixel in the left-to-right and top-to-bottom order.

As has been described, the EPG generating unit 103 generates image files. Note that when generating an image file corresponding to a video image component, the generating unit 103 sets all the RGB components at "0". More specifically, when generating an image file for a video image component, the generating unit 103 determines the position, size, and the α values but no RGB components. This is because the RGB components are not determined when an image file is generated since video image components correspond to a program and are transmitted from the broadcasting station in real time. The RGB components of the image file corresponding to a video image component are determined by the video reproducing unit 105, which will be described later.

Figure 5:
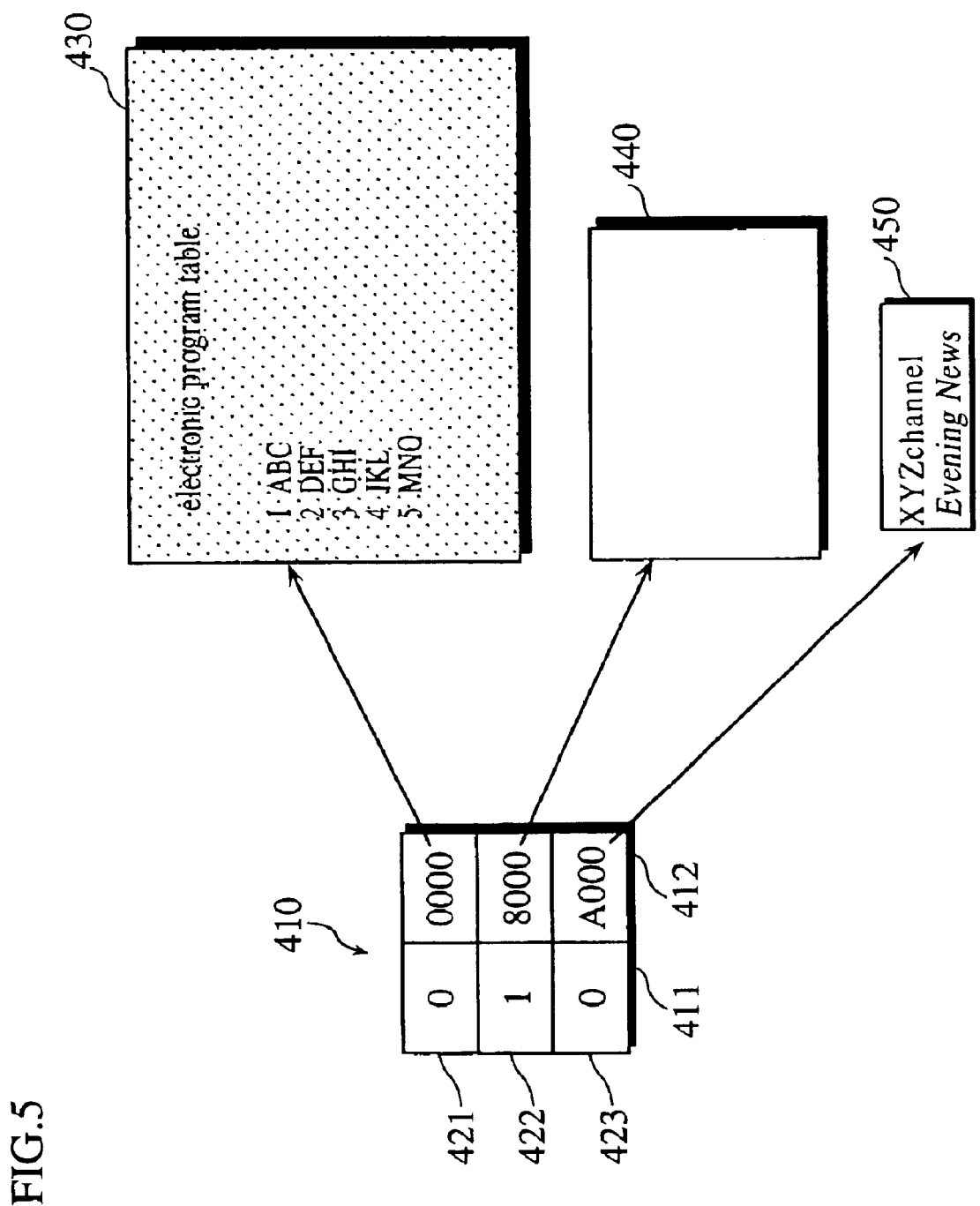
FIG. 5 shows an example of the index file.

FIG. 5 shows an example of the index file. An index file 410 in FIG. 5 includes image information 421, 422, and 423. The image information 422 is overlaid on the image information 421, and the image information 423 is overlaid on the image information 422. More specifically, the image information 421 corresponds to the component 202 that is positioned at the lowest layer, the image information 422 corresponds to the component 203 at the next layer, and the image information 423 corresponds to the component 204 at the uppermost layer. The values in a column 411 indicate the image types of the components. The value "0" indicates the graphical image, while the value "1" the video image. On the other hand, the values in a column 412 indicates the storage positions.

Meanwhile, images 430, 440, and 450 correspond to the components 202, 203, and 204, respectively. The images 430, 440 and 450 show the image data in the corresponding image files in the form of image. Here, the image 440 shows that all the RGB components of the image data corresponding to the component 203 are "0".

The image holding unit 104 is composed of a memory, a hard disk, or the like. The image holding unit 104 holds the image file and index file that have been generated by the EPG generating unit 103.

The video reproducing unit 105 receives the program from the broadcasting station and decodes the program. Then, the video reproducing unit 105 reproduces video images at the frame rate of dozens of frames per second and stores the video image data on the video plane 106 in order. When storing the video image data, the video reproducing unit 105 determines the layout with reference to the composite image 201 according to the position and size that have been input from the EPG generating unit 103. By doing so, the video reproducing unit 105 stores the RGB components in an area on the video plane 106 according to the layout.

The video plane 106 is composed of memory or the like. The video plane 106 holds video image data that has been stored by the video reproducing unit 105 and a composite α value that has been stored by the second compositing unit 109. A composite α value indicates the transparency of one of a plurality of pixels when the plurality of pixels are combined. More specifically, the composite α values held by the video plane 106 indicate the transparency of the pixels of the video image component when the plurality of components are composited.

Figure 6:
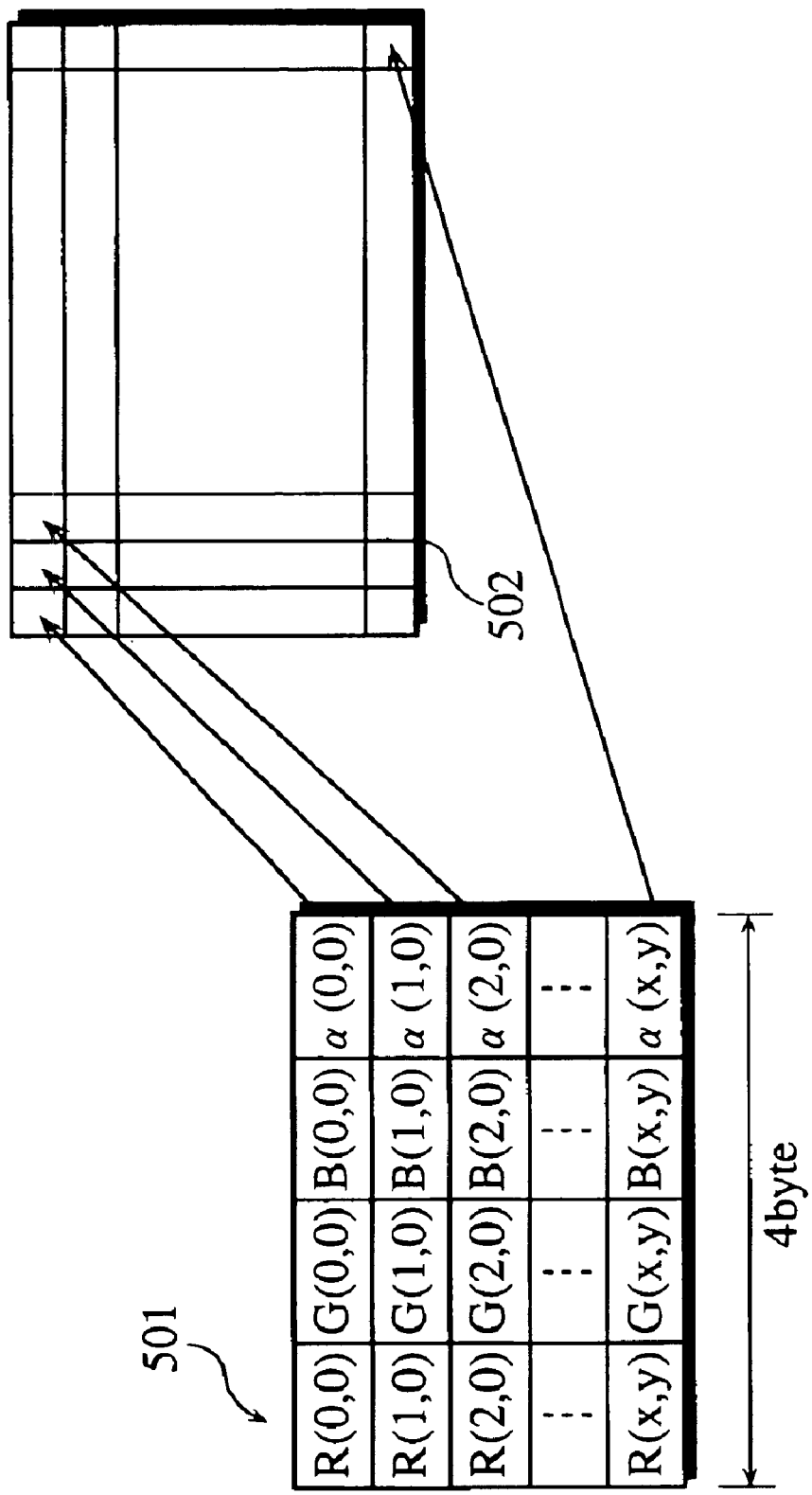
FIG. 6 shows the structure of video image data.

FIG. 6 shows the structure of a video image file. As shown in FIG. 6, video image data 501 is composed of a group of pixel data. Each piece of the pixel data is composed of RGB components and a composite a value. An image 502 is a diagram for showing the correspondence between each of the pixel data and a different pixel position in the image.

Figure 7:
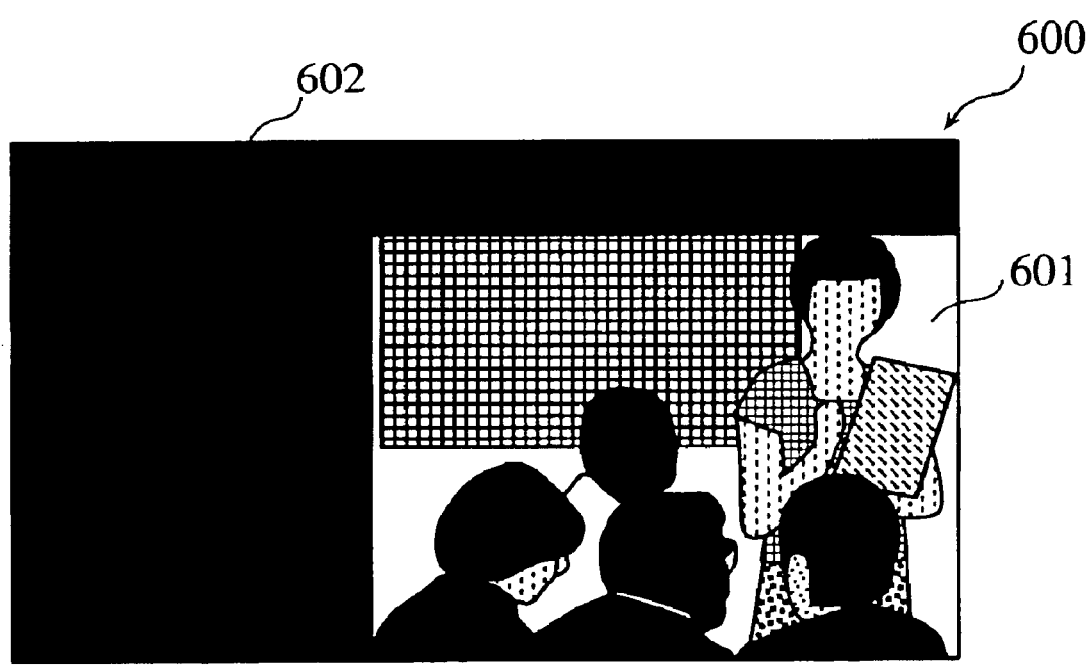
FIG. 7 shows the pixel data in video image data 501 in the visual form.

FIG. 7 shows the pixel data in the video image data 501 in the visual form. As shown in FIG. 7, an image 600 corresponding to the video image data 501 is composed of an area 601 corresponding to the component 203 and an area 602 corresponding to the remaining part. The image 600 has the same height and width as the composite image 201. The video plane 106 receives the RGB components of the area 601 from the video reproducing unit 105 and the α values from the second compositing unit 109. Meanwhile, the video plane 106 holds "0" as the RGB components and the α values of the area 602 in advance. The RGB components of the area 601 are updated at the rate of dozens of frames per second in accordance with the reproduction rate of the video reproducing unit 105.

The OSD plane 107 is composed of a memory or the like. The OSD plane 107 holds first composite image data that has been output from the first compositing unit 108.

Figure 8:
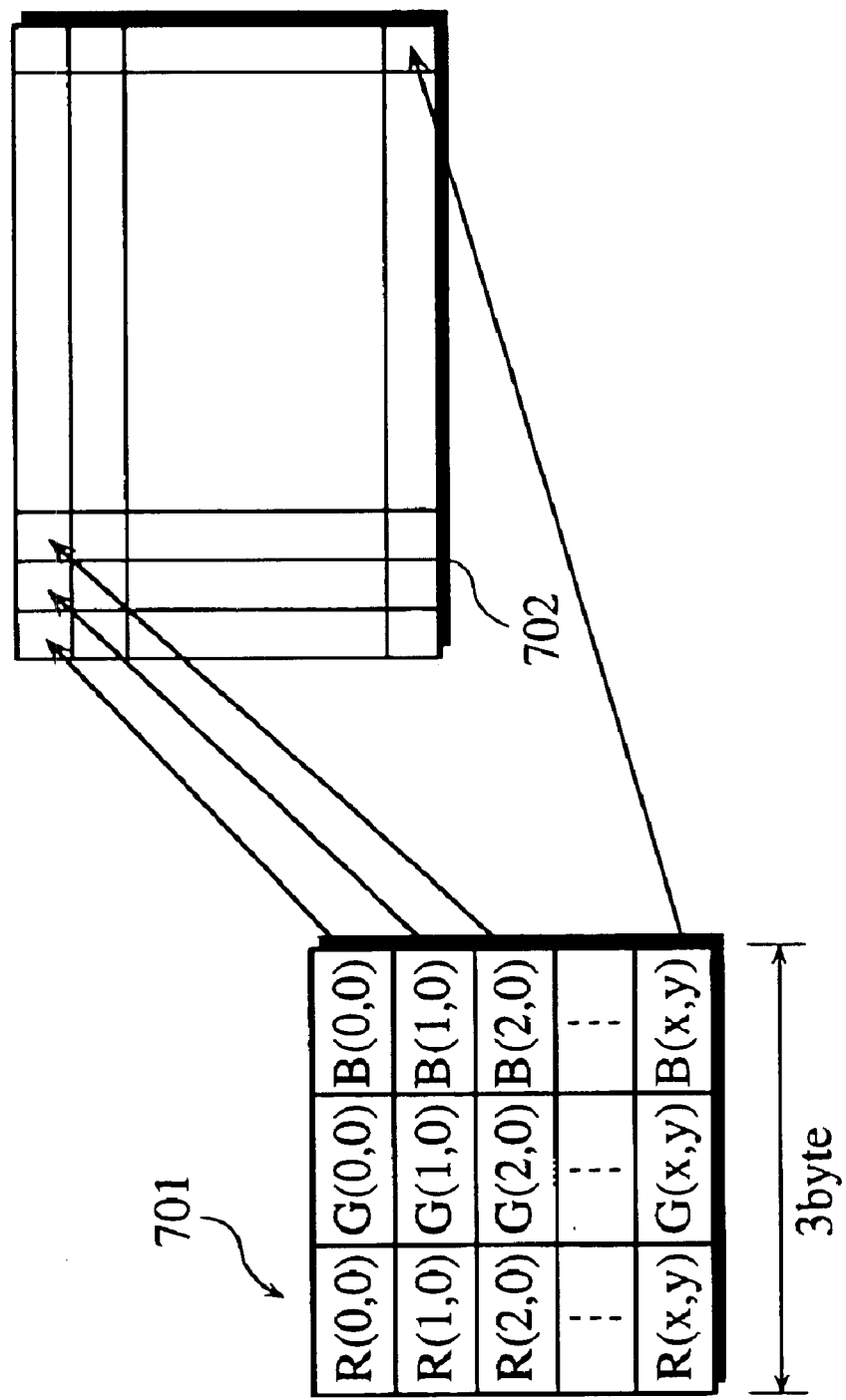
FIG. 8 shows the data structure of first composite image data.

FIG. 8 shows the data structure of first composite image data 701. The first composite image data 701 is composed of a group of RGB components. The first composite image data 701 corresponds to the result of compositing the components 202 and 204, i.e., the compositing result of the graphical image components. The compositing will be described later.

An image 702 is a diagram for showing the correspondence between each set of the RGB components and a different pixel position in the image. As shown in FIG. 8, each set the RGB components corresponds to a different pixel in the left-to-right and top-to-bottom order. The image 702 has the same height and width as the composite image 201 in pixel units.

The first compositing unit 108 combines the image data of the plurality of image files that have been stored in the image holding unit 104 to generate the first composite image data. The first composite image data is stored on the OSD plane 107. This processing is referred to as the "first compositing processing".

Figure 9:
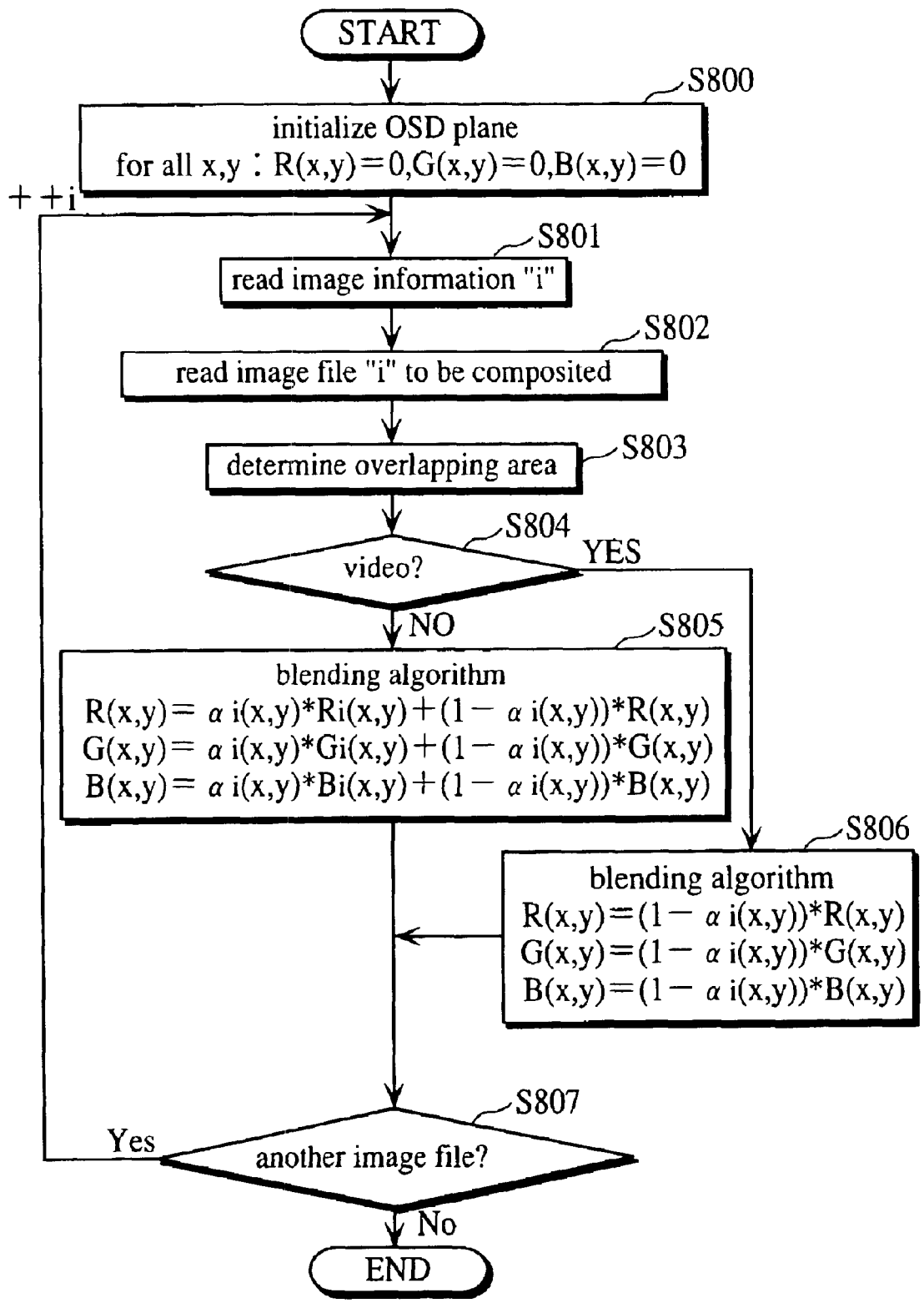
FIG. 9 is a flowchart showing the first compositing processing.

FIG. 9 is a flowchart showing the first compositing processing.

To begin with, the first compositing unit 108 initializes the OSD plane 107 (step S800). More specifically, all the areas for RGB components are set to be "0" on the OSD plane 107.

Next, the first compositing unit 108 repeats the operations at steps S801 to S807 to composite graphical image components in turn in the bottom-to-top order.

At step S801, the first compositing unit 108 reads image information "i" from the index file in the image holding unit 104. Here, the letter "i" is a variable that indicates a number assigned to a component. Numbers are assigned to the overlaid components from the bottom to the top in the ascending numeric order. The image information and the image file corresponding to a component "i" are referred to as the "image information "i"" and the "image file "i"". In this flowchart, the initial value of "i" is set to "0" and the increment is "1".

Then, the first compositing unit 108 reads from the image holding unit 104 the image file "i" that has been stored in the storage position indicated by the image information "i" (step S802).

The first compositing unit 108 reads the size and the position to determine an area on the OSD plane 107 where the component "i" overlaps another component (step S803).

The first compositing unit 108 judges whether the image type indicated by the image information "i" is video image or graphical image (step S804).

When the image type is graphical image, the first compositing unit 108 performs the α blending algorithm for the RGB components of the image file "i" and the RGB components in the overlapping area on the OSD plane 107 (step S805). The α blending algorithm is given below.

$$R(x,y) = \alpha i(x,y)*Ri(x,y) + (1-\alpha i(x,y))*R(x,y)$$

$$G(x,y) = \alpha i(x,y)*Gi(x,y) + (1-\alpha i(x,y))*G(x,y)$$

$$B(x,y) = \alpha i(x,y)*Bi(x,y) + (1-\alpha i(x,y))*B(x,y) \quad \text{Equation Group 2}$$

In these equations, the terms $R(x,y)$, $G(x,y)$, and $B(x,y)$ on the left sides indicate RGB components that are to be newly obtained. The terms $Ri(x,y)$, $Gi(x,y)$, $Bi(x,y)$, and $\alpha i(x,y)$ indicate RGB components and an a value of the image file "i". On the other hand, the terms $R(x,y)$, $G(x,y)$, and $B(x,y)$ on the right sides indicate RGB components that are held in the overlapping area on the OSD plane 107. More specifically, the value $R(x,y)$ on the left side is obtained as follows. The values $Ri(x,y)$ and $R(x,y)$ are weighted with values $\alpha i$ and $1-\alpha i$, respectively. The sum of the weighting results is the value $R(x,y)$ on the left side. The values $G(x,y)$ and $B(x,y)$ are obtained in the same manner. The first compositing unit 108 stores the newly obtained RGB components $R(x,y)$, $G(x,y)$, and $B(x,y)$ on the OSD plane 107.

On the other hand, when it is judged that the image type is video image at step S804, the first compositing unit 108 performs arithmetic operations according to the equations given below using the a values of the image file "i" and the RGB components in the overlapping area on the OSD plane 107 (step S806).

$$R(x,y) = (1-\alpha i(x,y))*R(x,y)$$

$$G(x,y) = (1-\alpha i(x,y))*G(x,y)$$

$$B(x,y) = (1-\alpha i(x,y))*B(x,y) \quad \text{Equation Group 3}$$

In these equations, the terms $R(x,y)$, $G(x,y)$, and $B(x,y)$ on the left sides indicate RGB components that are to be newly obtained. The term $\alpha i(x,y)$ indicates an α value of the image file "i". On the other hand, the terms $R(x,y)$, $G(x,y)$, and $B(x,y)$ on the right sides indicate RGB components that are held in the overlapping area on the OSD plane 107. More specifically, the value $R(x,y)$ on the left side is obtained by weighting the $R(x,y)$ on the right side with a value $1-\alpha i(x,y)$. The values $G(x,y)$ and $B(x,y)$ are obtained in the same manner.

When the first terms on the right sides of the equations in Equation Group 2 are set as "0", the equations in Equation Groups 2 and 3 become the same.

In the first terms on the right sides of the equations at step S805, the RGB components of the image file are weighted with the value α. Accordingly, the RGB components of the video image are not weighted with the value α in the equations at step S806.

The first compositing unit 108 stores the RGB components $R(x,y)$, $G(x,y)$, and $B(x,y)$ that have been calculated at step S805 or S806 on the OSD plane 107.

When the first compositing unit 108 has performed the processing for all the image files as has been described, the first compositing processing is completed (step S807).

As a result of the first compositing processing, the result of the compositing the graphical image components is held on the OSD plane 107.

The second compositing unit 109 calculates the composite α values for the video image component and stores the calculated composite a values to perform "second compositing processing".

Figure 10:
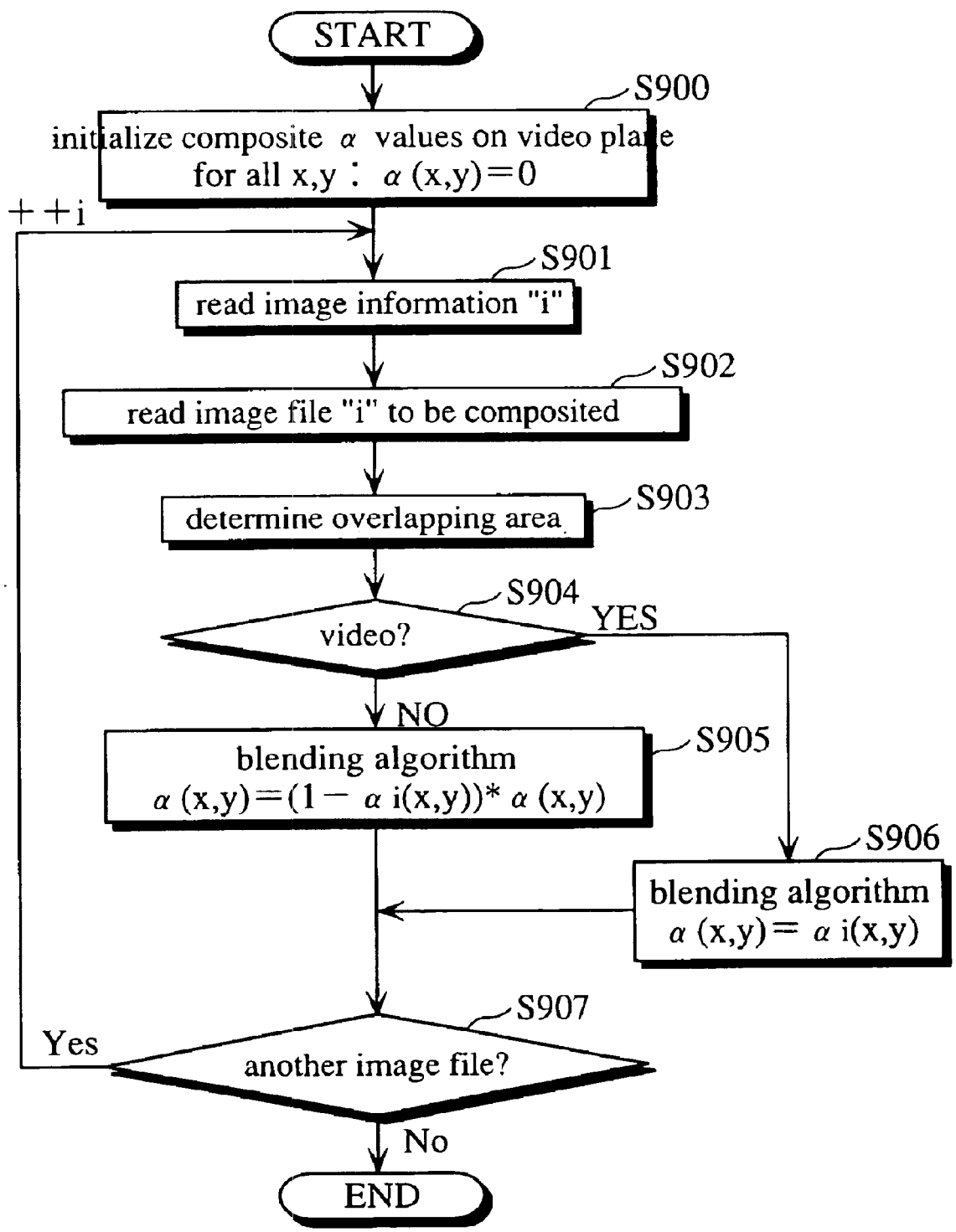
FIG. 10 is a flowchart showing the second compositing processing.

FIG. 10 is a flowchart showing the second compositing processing.

To begin with, the second compositing unit 109 initializes the composite α values on the video plane 106 (step S900). More specifically, all the areas for composite α values are set to be "0" on the video plane 106. The composite α values, as a result of the processing in FIG. 10, retain the α composite values for the video image component.

Next, the second compositing unit 109 repeats the operations at steps S901 to S907.

At step S901, the second compositing unit 109 reads image information "i" from the index file in the image holding unit 104. Here, the letter "i" is a variable that indicates a number assigned to a component. Numbers are assigned to the overlaid components from the bottom to the top in the ascending numeric order. The image information and the image file corresponding to a component "i" are referred to as the "image information "i"" and the "image file "i"". In this flowchart, the initial value of "i" is set to "0" and the increment is "1".

Then, the second compositing unit 109 reads from the image holding unit 104 the image file "i" that has been stored in the storage position indicated by the image information "i" (step S902).

The second compositing unit 109 reads the size and the position to determine an area on the video plane 106 where the component "i" overlaps another component (step S903).

The second compositing unit 109 judges whether the image type indicated by the image information "i" is video image or graphical image (step S904).

When the image type is graphical image, the second compositing unit 109 calculates newly composited a value based on the composited α value of the image file "i" and the composited α value in the overlapping area on the video plane 106 (step S905). The equation for this calculation is given below.

$$\alpha(x,y) = (1-\alpha i(x,y))*\alpha(x,y) \quad \text{Equation Group 4}$$

In this equation, the term $\alpha(x,y)$ on the left side indicates a composite a value that is to be newly obtained. The term $\alpha i(x,y)$ indicates an α value of the image file "i". On the other hand, the term $\alpha(x,y)$ on the right side indicates an α value that is held in the overlapping area on the video plane 106.

The second compositing unit 109 stores the newly obtained composite α values α(x,y) on the video plane 106.

On the other hand, when it is judged that the image type is video image at step S904, the second compositing unit 109 performs arithmetic operations according to the equation given below (step S906).

$$\alpha(x,y) = \alpha i(x,y) \qquad \text{Equation Group 5}$$

In this equation, the term α(x,y) on the left side indicates an α value that is to be newly obtained. The term αi(x,y) on the right side indicates an α value of the image file "i". More specifically, the α value αi(x,y) is the α value that is to be newly obtained.

The second compositing unit 109 stores the α values α(x,y) that have been calculated at step S905 or S906 on the video plane 106.

When the second compositing unit 109 has performed the processing for all the image files as has been described, the second compositing processing is completed (step S907). As a result, the composite α values are stored on the video plane 106.

When receiving normal reproduction instructions from the controller 102, the third compositing unit 110 outputs to the output unit 111 the RGB components that have been held on the video plane 106. Also, when receiving the EPG display instructions from the controller 102, the third compositing unit 110 performs "third compositing processing" to composite the RGB components stored on the video plane 106 with the RGB components of the first composite image data stored on the OSD plane 107. Then, the third compositing unit 110 outputs the composite image to the output unit 111.

The third compositing processing is indicated by the equations given below.

$$R(x,y) = \alpha(x,y) * Rv(x,y) + Ro(x,y)$$

$$G(x,y) = \alpha(x,y) * Gv(x,y) + Go(x,y)$$

$$B(x,y) = \alpha(x,y) * Bv(x,y) + Bo(x,y) \qquad \text{Equation Group 6}$$

Here, the terms R(x,y), G(x,y), and B(x,y) indicate the RGB components of each of the pixels that are to be output to the output unit 111 as a result of the third compositing processing. The terms α(x,y), Rv(x,y), Gv(x,y), and Bv(x,y) indicate each of the composite α values and each set of the RGB components of the video image data that is stored on the video plane 106. Meanwhile, terms Ro(x,y), Go(x,y), and Bo(x,y) indicate each set of the RGB components of the first composite image data.

Accordingly, the third compositing unit 110 calculates the sum of RGB components of the first composite image data held on the OSD plane 107 and the product of RGB components and a composite α value of the video image data held on the video plane 106 for each frame in the video reproduction.

The output unit 111 is composed of a CRT (Cathode-Ray Tube) or the like. The output unit 111 receives the RGB components that have been output from the third compositing unit 110 and displays the received RGB components.

(Operations)

Here, an explanation of the operations by the image compositing apparatus 100 will be given below.

Figure 11:
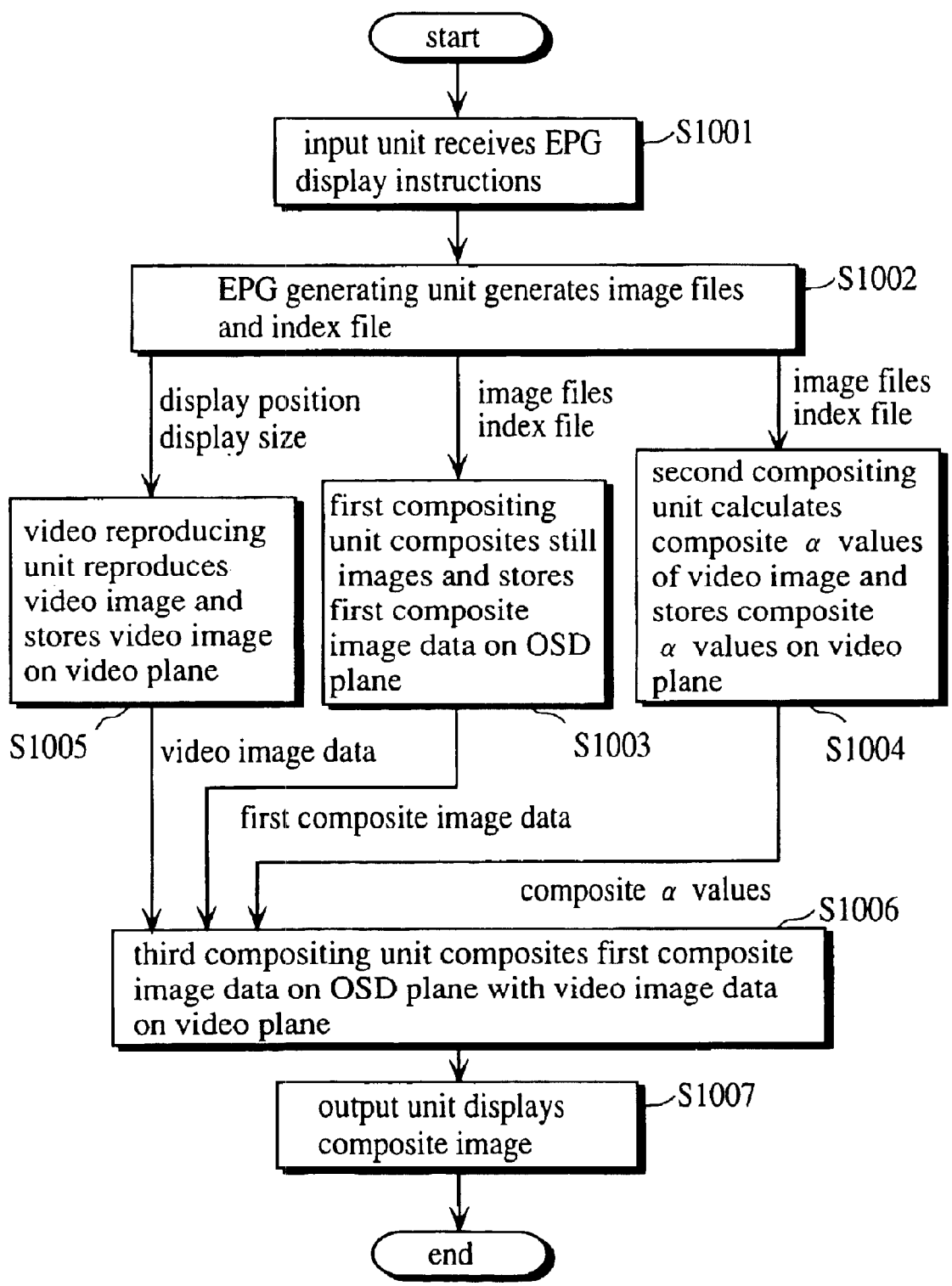
FIG. 11 is a chart for explaining the flow of the operations by image compositing apparatus 100 at the time of EPG display.

FIG. 11 is a chart for explaining the flow of the operations by the image compositing apparatus 100 at the time of the EPG display.

In FIG. 11, operations by elements of the image compositing apparatus 100 are indicated in the rectangles and the data flow by the arrows.

When received by the input unit 101 (step S1001), the EPG display instructions is sent to the other elements via the controller 102. When receiving the EPG instructions, the EPG generating unit 103 generates image files and an index file according to the EPG information that has been broadcast. The generated image files and index file are stored in the image holding unit 104. Also, the EPG generating unit 103 informs the video reproducing unit 105 of the position and size of the video image component that has been obtained when generating the image files (step S1002).

The first compositing unit 108 combines the RGB components in the overlapping areas in graphical image components stored in the image holding unit 104. The combined RGB components are stored on the OSD plane 107 (step S1003).

The second compositing unit 109 calculates the composite α values for the video image component according to the α values of the image files that have been stored in the image holding unit 104. The calculated composite α values are stored on the video plane 106 (step S1004).

The video reproducing unit 105 reproduces the video image and stores the video image data on the video plane 106 according to the layout indicated by the size and position that have been obtained from the EPG generating unit 103 (step S1005).

The third compositing unit 110 weighted the RGB components of the video image component with the composite α values. Then, the RGB components of the first composite image data are added to the weighted RGB components to obtain the RGB components of the composite image. The obtained RGB components of the composite image are output to the output unit 111 (step S1006).

The output unit 111 displays the composite image RGB components from the third compositing unit 110 (step S1007).

In FIG. 9, operations at steps S1003, 1004, 1005, and 1006 are performed in parallel. The operation at step S1006 is performed at the same rate as the reproduction rate of the video image data at step S1005.

<Supplemental Remarks>

Supplemental remarks will be given below on the compositing of video and graphical images, which is an important feature of the present invention.

Figure 12:
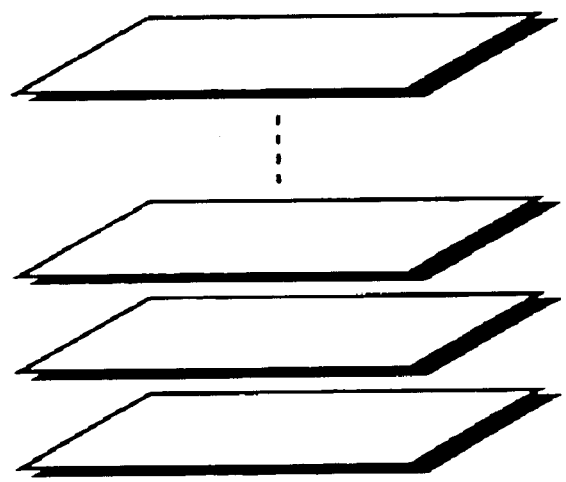
FIG. 12 shows a component group, which is composed of N+1 video and/or graphical image components.

FIG. 12 shows a component group, which is composed of N+1 video and/or graphical image components. Each of the components has RGB components and an a value an shown in FIG. 12. Note that the α value is α0=1.0 for the component positioned at the lowest layer of the layer. The RGB components of the composite image of the component group 1101 is obtained according to the equations given below.

$$R = \Sigma(\beta i * Ri)$$

i=0 to N $$G = \Sigma(\beta i * Gi)$$

i=0 to N $$B = \Sigma(\beta i * Bi)$$

i=0 to N $\qquad$ Equation Group 7

Note that $$\beta i = \alpha i \pi(1-\alpha j) \qquad \qquad ①$$

j=i+1 to N

In these equations, the term "βi" indicates the composition ratio of each of the pixels of the component "i" to the final composite image, i.e., the composite α value of each of the pixels. In this specification, the β value is referred to as the "contribution degree".

According to the present invention, when one of the components is a video image, arithmetic operations are performed as follow. First, the other components, i.e., the graphical image components are composited using α values. Then, the video image component is added to the result of the compositing of the graphical image components. Each of the graphical image components is represented by an image file including a size and a position. Composited on the OSD plane 107, the graphical image components can be efficiently composited with a small amount of memory such as the OSD plane 107, i.e., one OSD plane.

Accordingly, the processing can be efficiently performed with a small amount of memory, i.e., one OSD plane for graphical image and one video plane for video image.

Instead, if the video and graphical image components are composited in turn in the order of layer, the contribution degree of each of the pixels for all the components need to be calculated and stored on the memory. This requires a large amount of memory and not efficient.

Also, the arithmetic operation of the contribution degrees for each of the components includes many multiplications. More specifically, $N*(N-1)/2$ multiplications by $N^2$ orders of magnitude are required for N+1 components.

The present invention solves these problems. More specifically, sequential calculations with a few memories and multiplications by N orders are realized. The relationship between the elements and the arithmetic operations are as follows. The first compositing unit 108 deals with the addition of the graphical image components, the second compositing unit 109 calculation of the contribution degrees of the video image, and the third compositing unit 110 the addition of the video image.

FIG. 13 shows a program for the arithmetic operations of the present invention written in the form of the C language. This program focuses on one pixel. The letters "R", "G", and "B" indicate the RGB components of one pixel on the OSD plane, and the letter "α" the composite α value of a pixel of a video image corresponding to the pixel. Meanwhile, the letters "Ri", "Gi", "Bi", and "αi" indicate the RGB components and the α value of a pixel of the "i"th component corresponding to the pixel, the letters "Rv", "Gv", and "Bv" the RGB components of a pixel of the video image corresponding to the pixel.

The first to fourth lines indicate the initialization processing, the fifth to 17th lines the addition of the graphical images, and the remaining lines the addition of the video image. Meanwhile, the seventh, eighth, ninth, 12th, 13th, and 14th indicate the arithmetic operations performed by the first compositing unit 108. Here, in the equations for compositing the video image, the RGB components are substantially set to be "0". The 10th and 15th lines indicate the arithmetic operations performed by the second compositing unit 109 to calculate the composite α value of the video image. The fifth, sixth, 11th, 16th, and 17th lines are commonly performed by the first compositing unit 108 and the second compositing unit 109. Meanwhile, the 18th to 20th lines indicate the arithmetic operations performed by the third compositing unit 110. Here, the 18th, 19th, and 20th lines may be performed by different threads in parallel. Also, the 18th to 20th lines may be an endless loop.

FIG. 14 shows the programs that realize the program shown in FIG. 13. The program in FIG. 13 is divided into programs 1 and 2. The output in the program 2 is an endless loop. The programs 1 and 2 can be performed in parallel. In this case, the state and process of overlaying can be displayed.

The Second Embodiment

<Structure>

Figure 15:
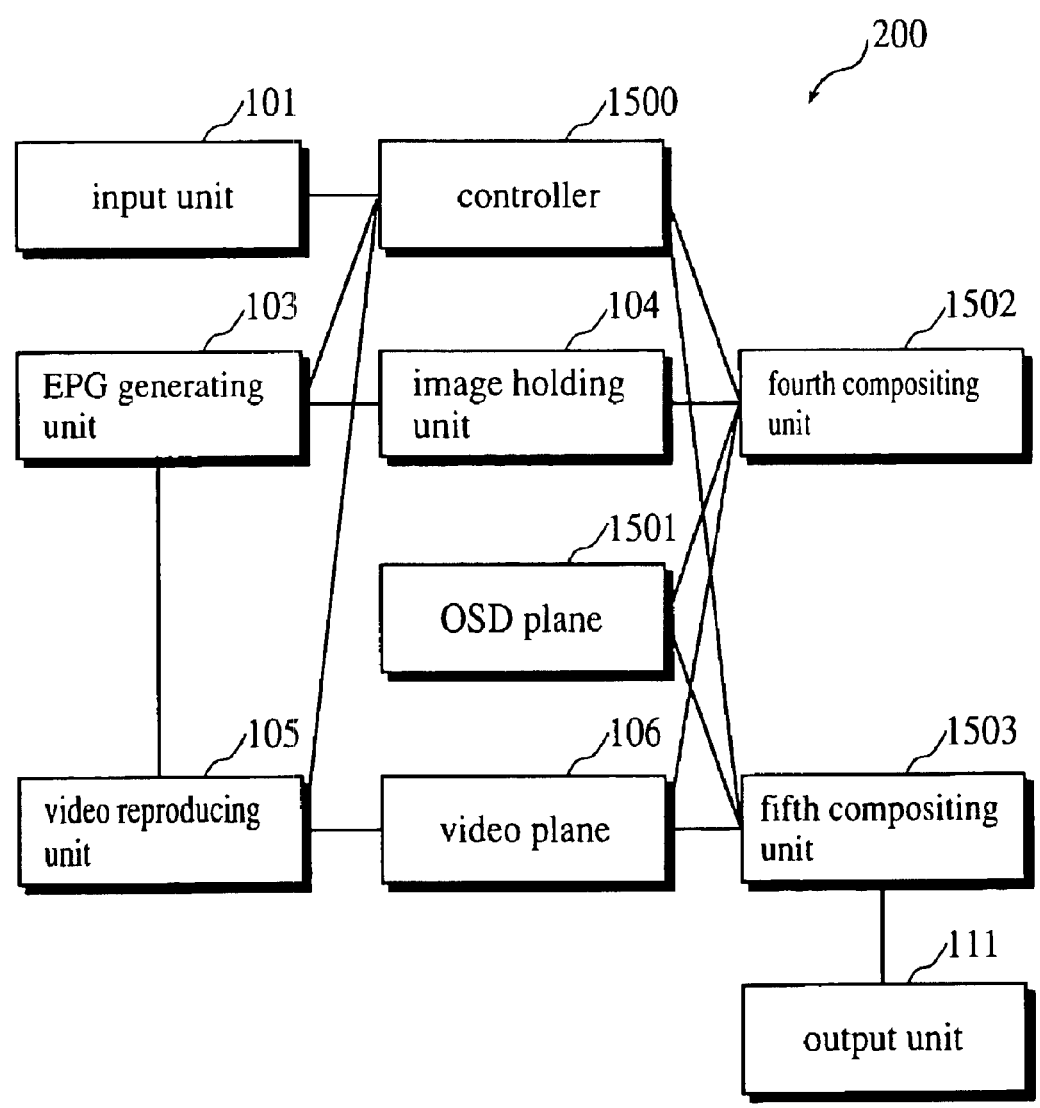
FIG. 15 is a block diagram showing the structure of an image compositing apparatus according to the second embodiment of the present invention.

FIG. 15 is a block diagram showing the structure of an image compositing apparatus according to the second embodiment of the present invention.

In FIG. 15, an image compositing apparatus 200 includes the input unit 101, a controller 1500, the EPG generating unit 103, the image holding unit 104, the video reproducing unit 105, the video plane 106, an OSD plane 1501, a fourth compositing unit 1502, a fifth compositing unit 1503, and the output unit 111. Note that the elements that have the same reference numbers as of the image compositing apparatus 100 have the same functions. The following explanation will focus on the elements that have the different reference numbers from the image compositing apparatus 100.

The controller 1500 controls all the elements of the image compositing apparatus 200. More specifically, when the user instructs to turn the image compositing apparatus 200 ON, the controller 1500 has the video reproducing unit 105 reproduce a program. When the user instructs to switch channels, the controller 102 has the video reproducing unit 105 reproduce another program. When the user instructs to turn the EPG display ON, the controller controls the EPG generating unit 103, the video reproducing unit 105, the fourth compositing unit 1502, the fifth compositing unit 1503, and the like so as to generate a composite image.

The OSD plane 1501 is composed of a memory or the like. The OSD plane 1501 holds the RGB components and the α values that has been output from the fourth compositing unit 1502. The OSD plane 1501 holds the RGB components and the α values corresponding to the pixels of image.

When receiving instructions from the controller 1500, the fourth compositing unit 1502 composites the image data of the plurality of image files held in the image holding unit 104. In the end, the fourth compositing unit 1502 generates fourth composite image data and stores the fourth composite image data on the OSD plane 1501. This processing is referred to as the "fourth compositing processing" in this specification.

Figure 16:
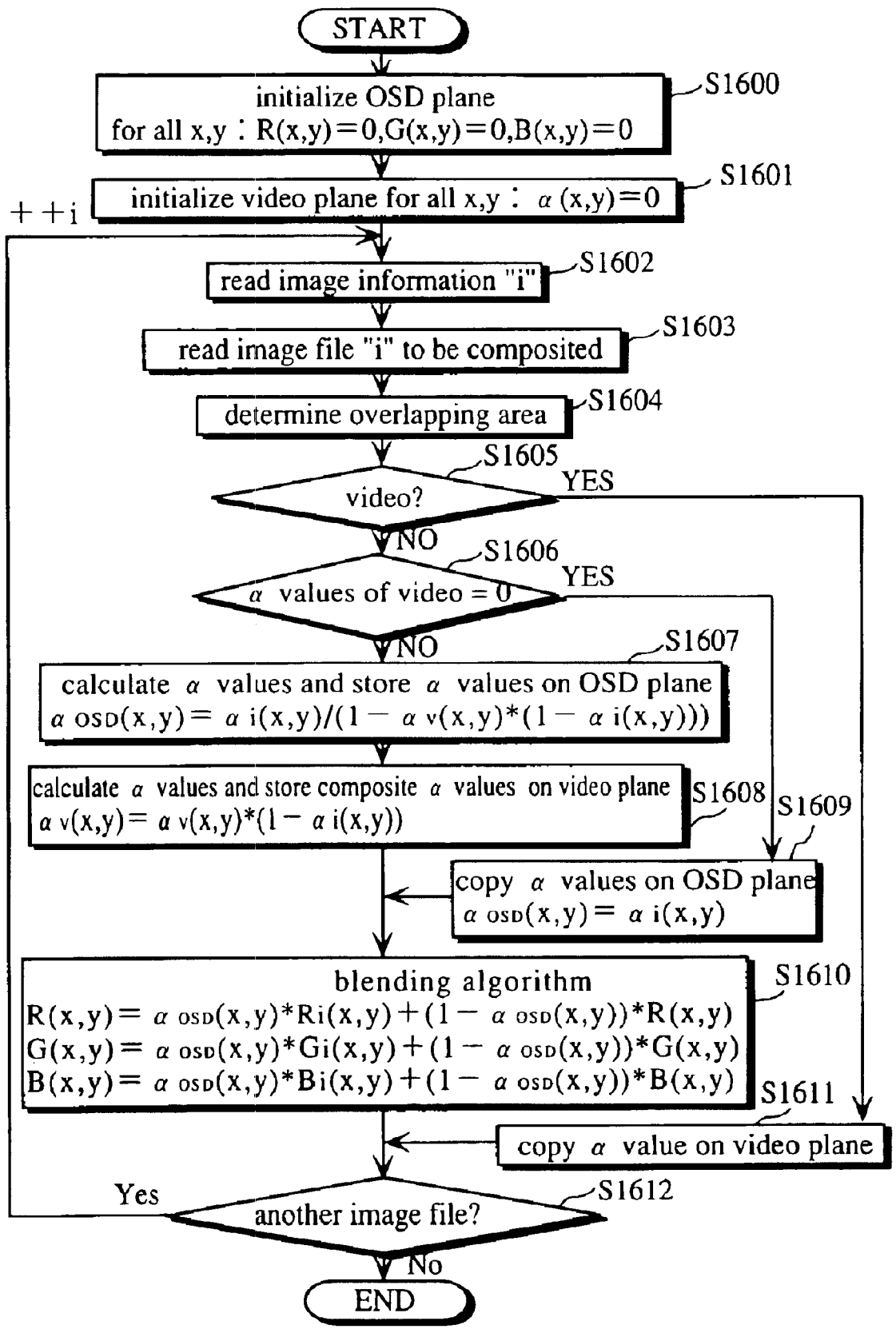
FIG. 16 is a flowchart showing fourth compositing processing.

FIG. 16 is a flowchart showing the fourth compositing processing.

To begin with, the fourth compositing unit 1502 sets all the areas for RGB component on the OSD plane 1501 and for α value on the video plane 106 to be "0" (steps S1600 and S1601)

Next, the fourth compositing unit 1502 repeats the operations at steps S1602 to S1612. More specifically, the fourth compositing unit 1502 composites graphical image components in turn in the bottom-to-top order. Also, the fourth compositing unit 1502 blends α values together for the video image component and stores the blended α values on the video plane 106.

At step S1602, the fourth compositing unit 1502 reads the image information "i" from the index file in the image holding unit 104. Here, the letter "i" is a variable that indicates a number assigned to a component. Numbers are assigned to the overlaid components from the bottom to the top in the ascending numeric order. The image information and the image file corresponding to a component "i" are referred to as the "image information "i"" and the "image file "i"". In this flowchart, the initial value of "i" is set to "0" and the increment is "1".

Then, the fourth compositing unit 1502 reads from the image holding unit 104 the image file "i" that has been stored in the storage position indicated by the image information "i" (step S1603).

The fourth compositing unit 1502 reads the size and the position to determine an area on the OSD plane 107 where the component "i" overlaps another component (step S1604).

The fourth compositing unit 1502 judges whether the image type indicated by the image information "i" is video image or graphical image (step S1605).

When the image type is video image, the fourth compositing unit 1502 copies the α values of the image file "i" on the video plane 106 (step S1611).

On the other hand, when the image type is graphical image, the fourth compositing unit 1502 judges whether all the α values held on the video plane 106 are "0" (step S1606). By doing so, the following processing is different according to whether a video image is included at the lower layer than the graphical image.

When it is judged that all the α values held on the video plane 106 are "0" at step S1606, the fourth compositing unit 1502 copies the α values of the image file "i" on the OSD plane 1501 (step S1609).

On the other hand, when it is judged that the α values held on the video plane 106 are not all "0", i.e., when at least one α value is not "0" on the video plane 106, at step S1606, the fourth compositing unit 1502 calculates new α values according to the equation given below using the α values held on the video plane 106 and the α values of the image file "i". Also, the fourth compositing unit 1502 stores the newly obtained α values on the OSD plane 1501 (step S1607).

$$\alpha osd(x, y) = \frac{\alpha i(x, y)}{1 - \alpha v(x, y) * (1 - \alpha i(x, y))} \quad \text{Equation Group 8}$$

Equation Group 8

In this equation, the term αosd(x,y) on the left side indicates an α value that is to be newly obtained. On the right side, the term αi(x,y) indicates an α value of the image file "i" and the term αv(x,y) an α value held on the video plane 106.

Moreover, the fourth compositing unit 1502 calculates α values for the video image according to the equation given below. The calculated α values are stored in the area for α value on the video plane 106 (step S1608).

$$\alpha v(x,y)=\alpha v(x,y)*(1-\alpha i(x,y)) \quad \text{Equation Group 9}$$

In this equation, the term αv(x,y) on the left side indicates an α value that is to be newly stored on the video plane 106. On the right side, the term αv(x,y) indicates an α value that has been stored on the video plane 106 before the storage of the newly obtained α value and the term αi(x,y) indicates an α value of the image file "i".

The fourth compositing unit 1502 performs the α blending algorithm for the RGB components of the image file "i" and the RGB components in the overlapping area on the OSD plane 107. The result of the α blending algorithm is stored on the OSD plane 1501 (step S1610). The α blending algorithm is given below.

$$R(x,y)=\alpha osd(x,y)*Ri(x,y)+(1-\alpha osd(x,y))*R(x,y)$$
$$G(x,y)=\alpha osd(x,y)*Gi(x,y)+(1-\alpha osd(x,y))*G(x,y)$$
$$B(x,y)=\alpha osd(x,y)*Bi(x,y)+(1-\alpha osd(x,y))*B(x,y) \quad \text{Equation Group 10}$$

In these equations, the terms R(x,y), G(x,y), and B(x,y) on the left sides indicate RGB components that are to be newly obtained. On the right sides, the terms R(x,y), G(x,y), B(x,y), and αosd indicate RGB components and an α value held on the OSD plane 1501. Also, the terms Ri(x,y), Gi(x,y), and Bi(x,y) on the right sides indicate RGB components of the image file "i".

The fourth compositing unit 1502 performs the processing from steps S1602 to S1612 as has been described for all the image files to complete the fourth compositing processing (step S1612).

As a result of the fourth compositing processing, the result of the compositing the graphical image components is held on the OSD plane 1501, the composite α values of the video image component in the area for α value on the video plane 106.

When receiving normal reproduction instructions from the controller 1500, the fifth compositing unit 1503 outputs to the output unit 111 the RGB components that have been held on the video plane 106.

Also, when receiving the EPG display instructions from the controller 1500, the fifth compositing unit 1503 performs "fifth compositing processing" to composite the RGB components and α values of the video image data stored on the video plane 106 with the RGB components of the fourth composite image data stored on the OSD plane 1501. Then, the fifth compositing unit 1503 outputs the compositing result to the output unit 111.

The fifth compositing processing is indicated by the equations given below.

$$R(x,y)=\alpha(x,y)*Rv(x,y)+Ro(x,y)$$
$$G(x,y)=\alpha(x,y)*Gv(x,y)+Go(x,y)$$
$$B(x,y)=\alpha(x,y)*Bv(x,y)+Bo(x,y) \quad \text{Equation Group 11}$$

Here, the terms R(x,y), G(x,y), and B(x,y) indicate the RGB components of each of the pixels that are to be output to the output unit 111 as a result of the fifth compositing processing. The terms α(x,y), Rv(x,y), Gv(x,y), and Bv(x,y) indicate each of the composite α values and each set of the RGB components of the video image data that is stored on the video plane 106. Meanwhile, terms Ro(x,y), Go(x,y), and Bo(x,y) indicate each set of the RGB components of the fourth composite image data.

Accordingly, the fifth compositing unit 1503 composites a frame of video images with the fourth composite image data whenever the video image frame is updated.

<Operations>

Here, an explanation of the operations by the image compositing apparatus 200 will be given below.

Figure 17:
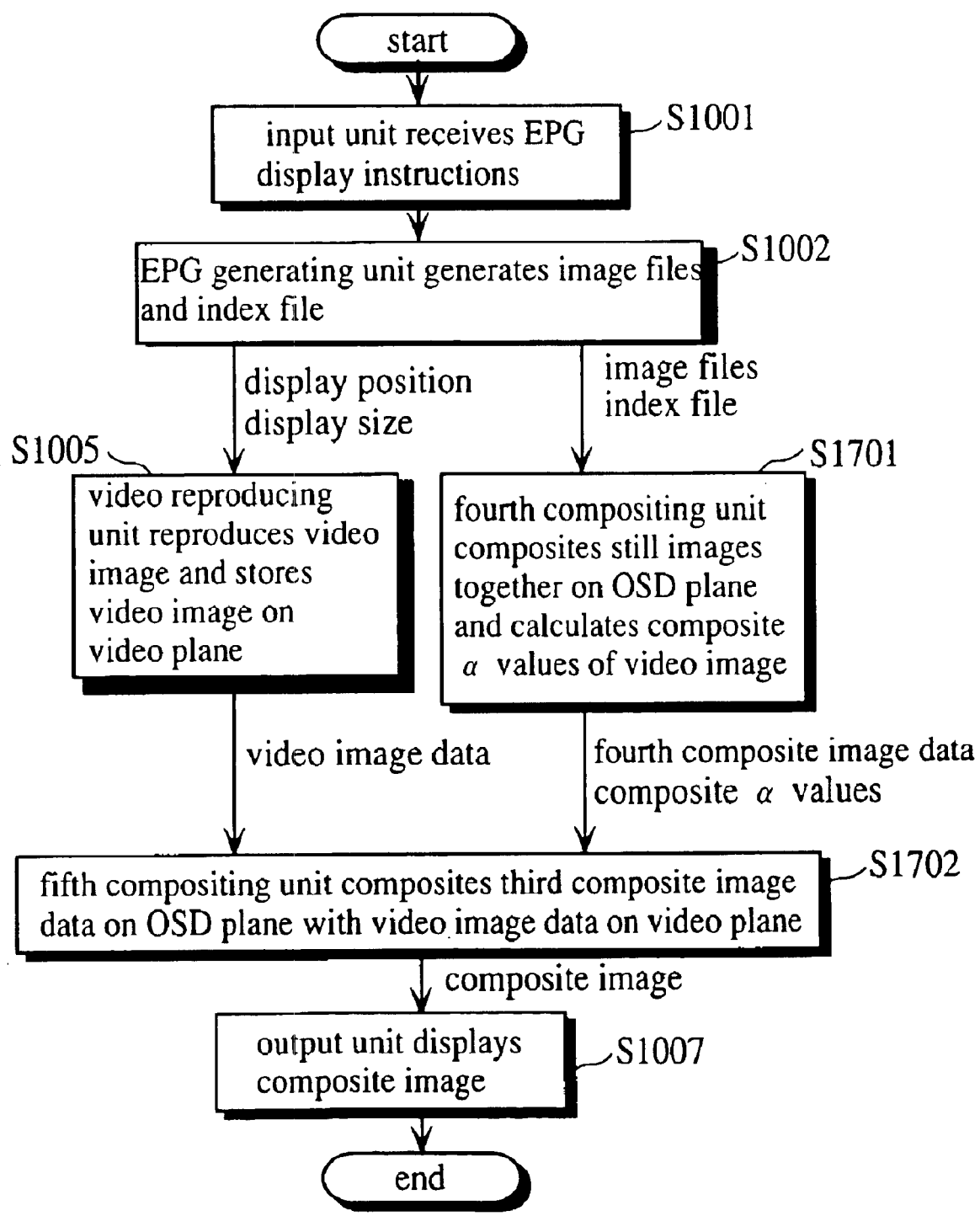
FIG. 17 is a chart for explaining the flow of the operations by an image compositing apparatus 200 at the time of EPG display.

FIG. 17 is a chart for explaining the flow of the operations by the image compositing apparatus 200 at the time of EPG display. In FIG. 17, operations by elements of the image compositing apparatus 200 are indicated in the rectangles and the data flow by the arrows. Note that at the steps in the flowchart in FIG. 17 that have the same reference numbers as in the flowchart in FIG. 11, the same operations as in FIG. 11 are performed.

When received by the input unit 101 (step S1001), the EPG display instructions is sent to the other elements via the controller 1500. When receiving the EPG instructions, the EPG generating unit 103 generates image files and an index file according to the EPG information that has been broadcast. The generated image files and, index file are stored in the image holding unit 104. Also, the EPG generating unit 103 informs the video reproducing unit 105 of the position and size of the video image component that has been obtained when generating the image files (step S1002).

The fourth compositing unit 1502 combines the RGB components in the overlapping areas in graphical image components stored in the image holding unit 104. The combined RGB components are stored on the OSD plane 1501. Also, the fourth compositing unit 1502 calculates the composite α values for the video image and stores the calculated composite α values on the video plane 106 (step S1701).

The video reproducing unit 105 reproduces the video image and stores the video image data on the video plane 106 according to the layout indicated by the size and position that have been obtained from the EPG generating unit 103 (step S1005).

The fifth compositing unit 1503 weighted the RGB components of the video image component with the composite α values. Then, the RGB components of the fourth composite image data are added to the weighted RGB components to obtain the RGB components of the composite image. The obtained RGB components of the composite image are output to the output unit 111 (step S1702).

The output unit 111 displays the composite image RGB components from the fifth compositing unit 1503 (step S1007).

In FIG. 17, operations at steps S1702, 1005, and 1701 are performed in parallel.

<Supplemental Remarks>

Figure 18:
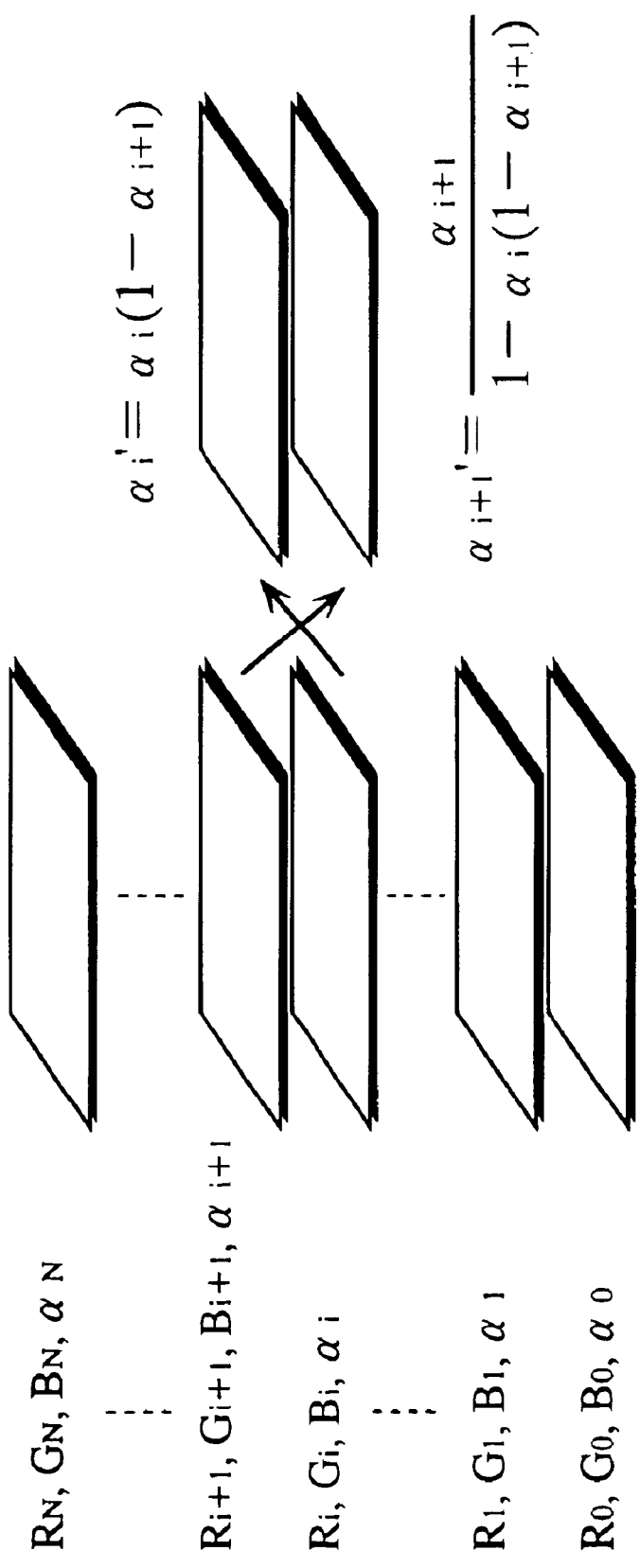
FIG. 18 is a diagram for explaining how to switch two adjacent components in the overlaying order of components.

In the compositing method according to the present embodiment, the order of any adjacent two components in the component layer are switched when composited as shown in FIG. 18. In this case, the α values of the switched two components are updated according to the equations given below.

In the following equations, each of the α value of the lower component "i" after the switch is indicated by the term $\alpha i+1'$ and each of the α values of the upper component "i+1" the term $\alpha i'$.

$$\alpha i + 1' = \frac{\alpha i + 1}{1 - \alpha i(1 - \alpha i + 1)}$$

$$\alpha i' = \alpha i(1 - \alpha i + 1)$$

Equation Group 12

Here, Equation Group 12 is obtained as follows.

Suppose that the α values of the components "i" and "i+1" before the switch are $\alpha i$ and $\alpha i+1$, the contribution degrees $\beta i$ and $\beta i+1$ of pixels of the components "i" and "i+1" before the switch to the final composite image are obtained according to the equations given below.

$$\beta i = \alpha i \pi(1-\alpha j) \qquad ①$$

$j = i+1$ to $N$ $$\beta i+1 = \alpha i+1 * \pi(1-\alpha j) \qquad ②$$

$j = i+2$ to $N$

Equation Group 13

On the other hand, the contribution degrees $\beta i'$ and $\beta i+1'$ of pixels of the components "i" and "i+1" after the switch to the final composite image are obtained according to the equations given below.

$$\beta i+1' = \alpha i+1'*(1-\alpha i')\pi(1-\alpha j) \qquad ③$$

$j = i+2$ to $N$ $$\beta i' = \alpha i' * \pi(1-\alpha j) \qquad ④$$

$j = i+2$ to $N$

Equation Group 14

In order to have the same compositing result before and after the switch, it is enough that the results of the equations ① and ④ are the same and the equations ② and ③ also the same. More specifically, when the following equations are solved for the α values $\alpha i'$ and $\alpha i+1$, the results of the equations in Equation Group 12.

$$\alpha i \pi(1-\alpha j) = \alpha i'*\pi(1-\alpha j)$$

$j = i+1$ to $N$ $j = i+2$ to $N$ $$\alpha i+1 * \pi(1-\alpha j) = \alpha i+1'*(1-\alpha i')\pi(1-\alpha j)$$

$j = i+2$ to $N$ $j = i+2$ to $N$

Equation Group 15

Figure 19:
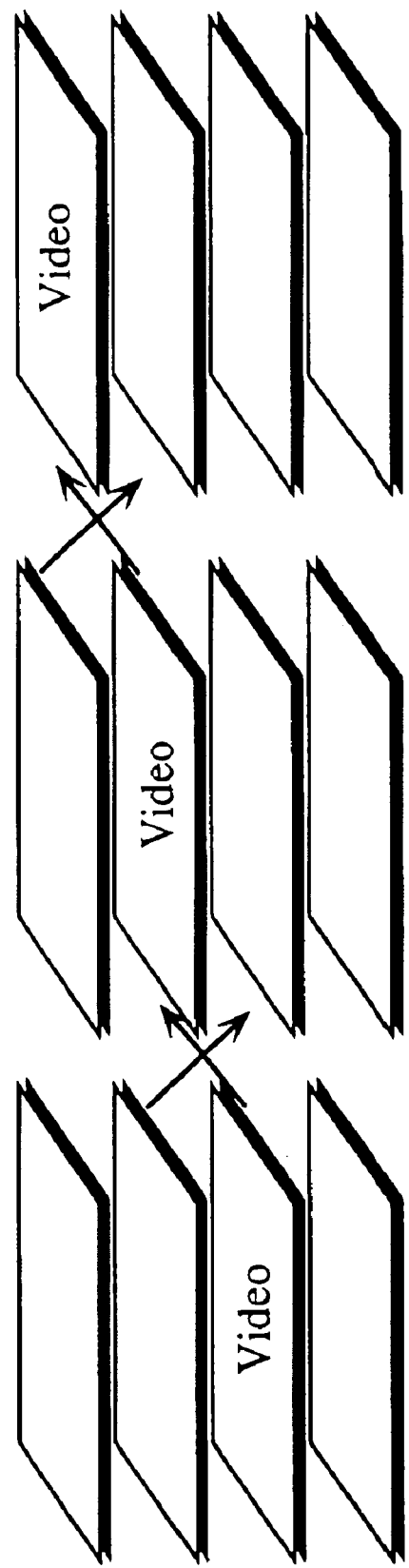
FIG. 19 shows how to switch video and graphical image components so that the video image component is positioned at the uppermost.

By switching the video image component and a graphical image component using this law so that the video image component is positioned at the uppermost as shown in FIG. 19, all the graphical image components are composited together and then the video image component is composited with the composite graphical image components.

As shown in the flowchart in FIG. 16, the fourth compositing unit 1502 efficiently calculates the α values necessary to switch the adjacent components. Also, the fourth compositing unit 1502 efficiently composites graphical image components and stores the compositing result on the OSD plane 1501. Meanwhile, the fifth compositing unit 1503 composites the OSD plane 1501 with the video plane 106.

The Third Embodiment

<Structure>

Figure 20:
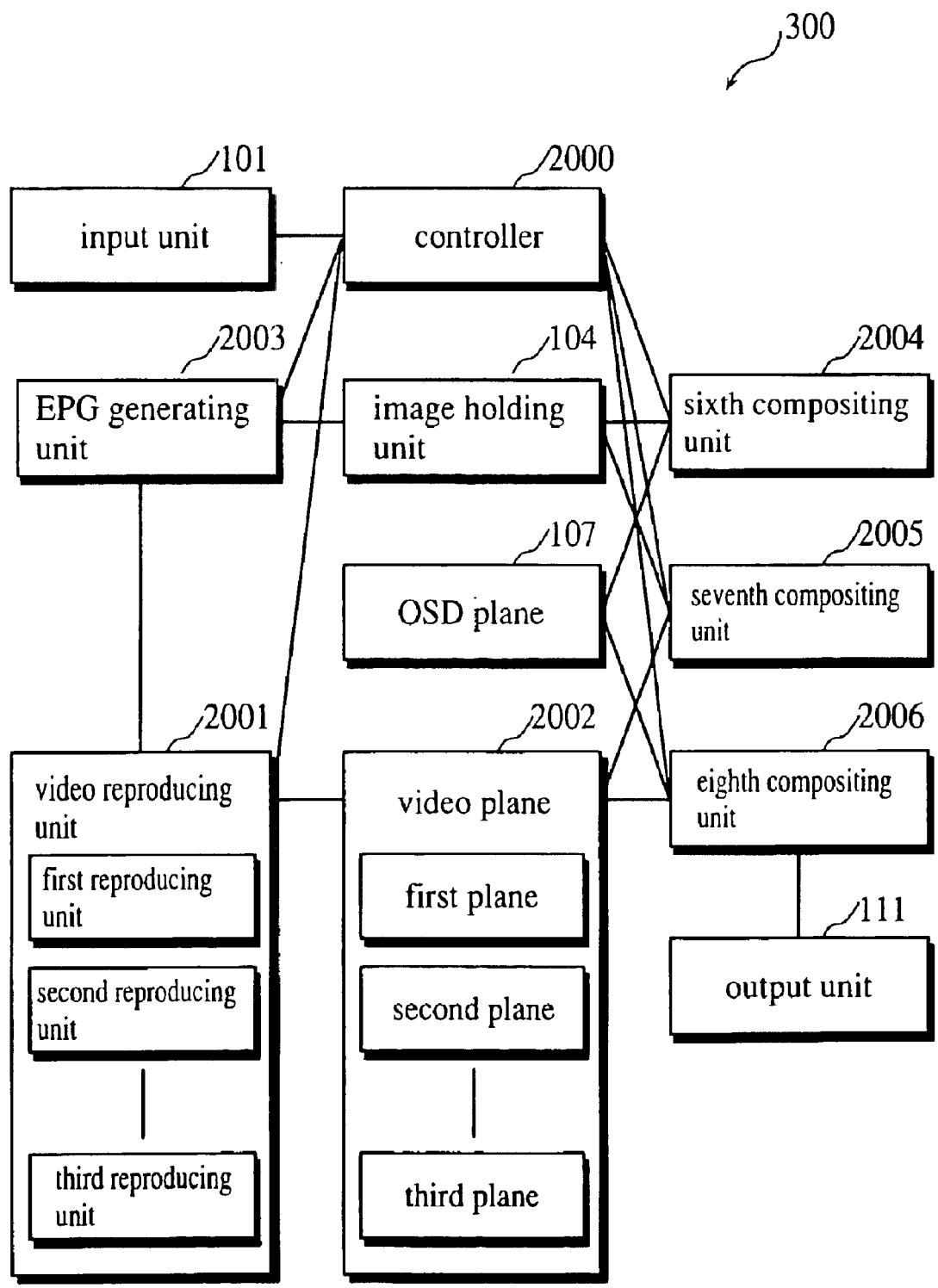
FIG. 20 is a block diagram showing the structure of an image compositing apparatus according to the third embodiment of the present invention.

FIG. 20 is a block diagram showing the structure of an image compositing apparatus according to the third embodiment of the present invention.

In FIG. 20, an image compositing apparatus 300 includes the input unit 101, a controller 2000, an EPG generating unit 2003, the image holding unit 104, a video reproducing unit 2001, a video plane 2002, the OSD plane 107, a sixth compositing unit 2004, a seventh compositing unit 2005, an eighth compositing unit 2006, and the output unit 111. With this structure, the image compositing apparatus 300 composites a plurality of video image components with a plurality of graphical image components. Note that the elements that have the same reference numbers as of the image compositing apparatuses 100 and 200 have the same functions. The following explanation will focus on the elements that have the different reference numbers from the image compositing apparatuses 100 and 200.

The controller 2000 controls all the elements of the image compositing apparatus 300. More specifically, when the user instructs to turn the image compositing apparatus 300 ON, the controller 2000 has the video reproducing unit 2001 reproduce a program. When the user instructs to switch channels, the controller 2000 has the video reproducing unit 2001 reproduce another program. When the user instructs to turn the EPG display ON, the controller 2000 controls the EPG generating unit 2003, the video reproducing unit 2001, the sixth compositing unit 2004, the seventh compositing unit 2005, the eighth compositing unit 2006, and the like so as to generate a composite image.

The video reproducing unit 2001 includes a plurality of reproducing units, i.e., a first reproducing unit, a second reproducing unit, ..., an Nth reproducing unit. Each of the reproducing units receives a different program. Also, the first to Nth reproducing units decode the received programs, reproduce the video images at dozens of frames per second, and store the video image data on the video plane 2002 while updating the video image data in frame units. When the video image data is stored on the video plane 2002, the video reproducing unit 2001 determines the layout of the video images on the final composite image according to the positions and sizes that have been input by the EPG generating unit 2003. Also, the video reproducing unit 2001 stores the RGB components of the video images on the corresponding areas on the video plane 2002.

The video plane 2002 includes a plurality of planes, i.e., a first plane, a second plane, . . . , and an Nth plane. Each of the planes is composed of a memory or the like. Each one of the planes corresponds to a different one of the plurality of reproducing units in the video reproducing unit 2001. The planes hold the video image data from the reproducing units and the composite α values from the seventh compositing unit 2005.

The EPG generating unit 2003 obtains the EPG information for the EPG display composed of a plurality of video image components and graphical image components from the broadcasting station. Also, the EPG generating unit 2003 generates a plurality of image files and one index file according to the EPG information. The image files and the index file are stored in the image holding unit 104. Furthermore, the EPG generating unit 2003 extracts from the EPG information the sizes and positions of the plurality of video image components that are to be composited into the EPG display image. The extracted sizes and positions are output to the video reproducing unit 2001.

The EPG generating unit 2003 is almost the same as the EPG generating unit 103. The difference is that the EPG generating unit 2003 is capable of dealing with a plurality of video image components.

The sixth compositing unit 2004 composites the image data of the plurality of image files held in the image holding unit 104. Then, the sixth compositing unit 2004 generates sixth composite image data and stores the sixth composite image data on the OSD plane 107. This processing is referred to as the "sixth compositing processing" in this specification. The sixth compositing processing is almost the same as the first compositing processing in the first embodiment shown in FIG. 9. The difference is that the operation at step S806 is repeated a plurality of times in the sixth compositing processing so as to deal with a plurality of video images.

When receiving instructions from the controller 2000, the seventh compositing unit 2005 calculates composite α values for each of the plurality of video image components. Also, the seventh compositing unit 2005 stores the calculated α values for each of the video image components on a different corresponding planes. This processing is referred to as the "seventh compositing processing" in this specification.

Figure 21:
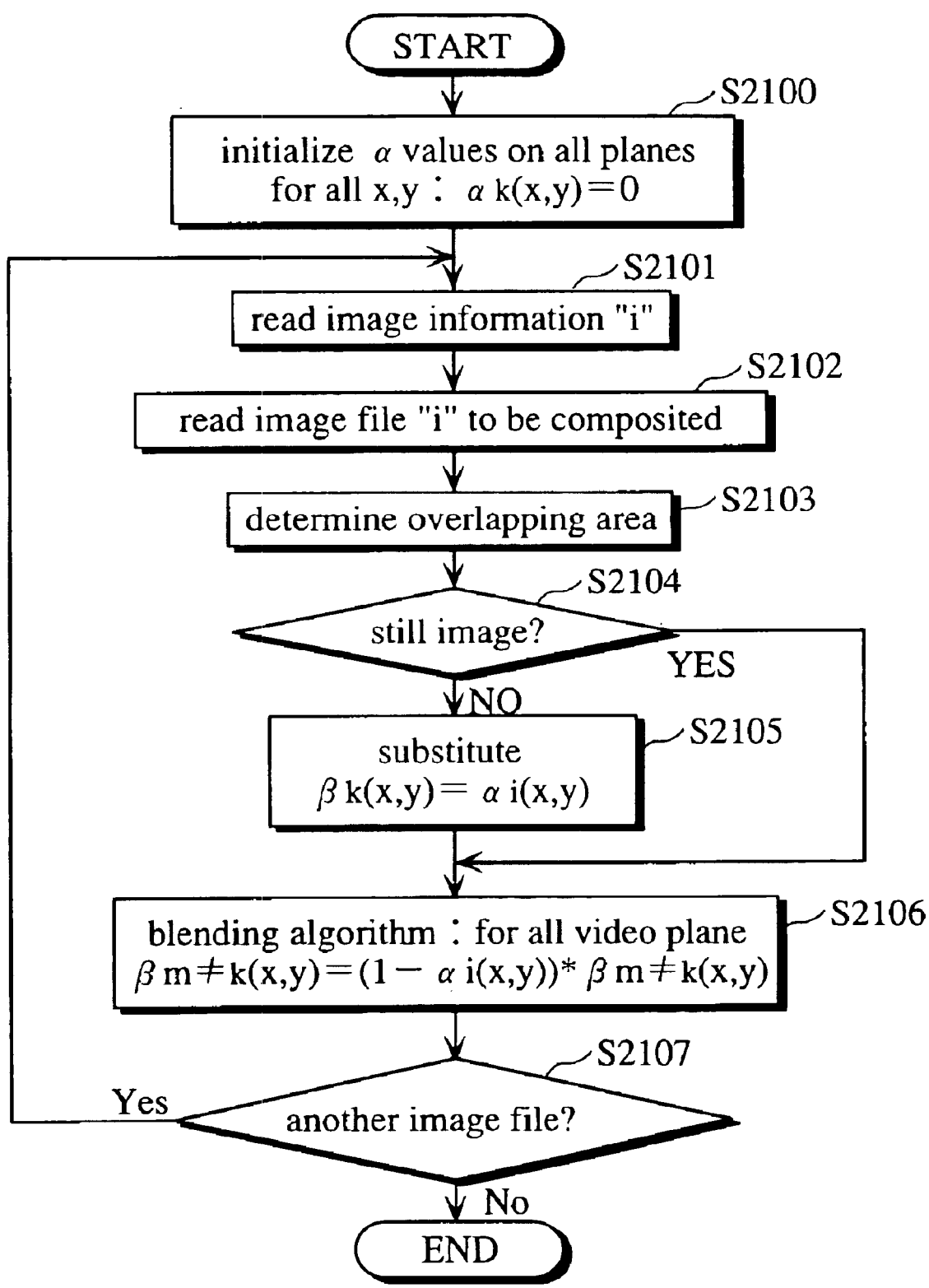
FIG. 21 is a flowchart showing seventh compositing processing.

FIG. 21 is a flowchart showing the seventh compositing processing.

To begin with, the seventh compositing unit 2005 initializes the composite α values on the video plane 2002 (step S2100). More specifically, the areas for α values in the planes are set to be "0" on the video plane 2002.

Next, the seventh compositing unit 2005 repeats the operations at steps S2101 to S2107.

At step S2101, the seventh compositing unit 2005 reads image information "i" from the index file in the image holding unit 104. Here, the letter "i" is a variable that indicates a number assigned to a component. Numbers are assigned to the overlaid components from the bottom to the top in the ascending numeric order. The image information and the image file corresponding to a component "i" are referred to as the "image information "i"" and the "image file "i"". In this flowchart, the initial value of "i" is set to "0" and the increment is "1".

Then, the seventh compositing unit 2005 reads from the image holding unit 104 the image file "i" that has been stored in the storage position indicated by the image information "i" (step S2102).

The seventh compositing unit 2005 reads the size and the position of the image file "i" to determine an area on the video plane 2002 where the component "i" overlaps another component (step S2103).

The seventh compositing unit 2005 judges whether the image type indicated by the image information "i" is video image or graphical image (step S2104).

When the image type is video image, the seventh compositing unit 2005 copies the α values of the image file "i" in the area for α value on the "k"th plane on the video plane 2002 (step S2105). The equation for the operation at step S2105 is given below.

$$\beta k(x,y) = \alpha i(x,y) \qquad \text{Equation Group 16}$$

In this equation, the term αi(x,y) on the left side indicates α value that is to be stored in the area for α value on the "k"th plane on the video plane 2002. The term αi(x,y) indicates an α value of the image file "i". The value of "k" is "1" to "N" and is incremented by "1" whenever the operation at step S2105 is performed.

After that, the seventh compositing unit 2005 updates the value of βm(x,y) for the area for α value on the "m"th plane, which is different from the "k"th plane, on the video plane 2002 using the equation given below.

$$\beta m(x,y) = (1 - \alpha i(x,y)) * \beta m(x,y) \qquad \text{Equation Group 17}$$

Here, the term βm(x,y) on the left side indicates each of the values that are to be stored in the area for α value on the "m"th plane. The value of "m" is from "1" to "N" excluding "k".

Accordingly, the arithmetic operations performed at step S2105 and S2106 is the same as arithmetic operation ① in Equation Group 7. As a result of the arithmetic operations at step S2105 or S2106, the composition ratio of each of the pixels of the video image components to the final composite image, i.e., each of the composite α values, is calculated.

When the seventh compositing unit 2005 has performed the processing for all the image files as has been described, the seventh compositing processing is completed (step S2107). As a result, the composite α values for each of the video image components are stored on the corresponding plane on the video plane 2002.

When receiving the EPG display instructions from the controller 2000, the eighth compositing unit 2006 performs "eighth compositing processing" to composite the RGB components on the planes on the video plane 2002 with the RGB components on the OSD plane 107. Then, the eighth compositing unit 2006 outputs the composite image to the output unit 111.

When the number of the video image components is "N", the eighth compositing processing is indicated by the equations given below.

$$R(x,y) = \beta 1(x,y)*Rv1(x,y) + \beta 2(x,y)*Rv2(x,y) + \ldots + \beta N(x,y)*RvN(x,y) + Ro(x,y)$$

$$G(x,y) = \beta 1(x,y)*Gv1(x,y) + \beta 2(x,y)*Gv2(x,y) + \ldots + \beta N(x,y)*GvN(x,y) + Go(x,y)$$

$$B(x,y) = \beta 1(x,y)*Bv1(x,y) + \beta 2(x,y)*Bv2(x,y) + \ldots + \beta N(x,y)*BvN(x,y) + Bo(x,y) \qquad \text{Equation Group 18}$$

Here, the terms R(x,y), G(x,y), and B(x,y) indicate RGB components of each of the pixels that are to be output to the output unit 111. The terms β1(x,y), Rv1(x,y), Gv1(x,y), and Bv1(x,y) indicate each of the composite α values and each set of the RGB components of the video image data that is stored on the first plane on the video plane 2002. Accordingly, the terms β2(x,y), Rv2(x,y), Gv2(x,y), and Bv2(x,y) indicate each of the composite α values and each set of the RGB components of the video image data that is stored on the second plane on the video plane 2002, and the terms βN(x,y), RvN(x,y), GvN(x,y), and BvN(x,y) each of the composite α values and each set of the RGB components of the video image data that is stored on the Nth plane on the video plane 2002. Meanwhile, the terms Ro(x,y), Go(x,y), and Bo(x,y) indicate each set of the RGB components stored on the OSD plane 107.

<Operations>

The operations by the image compositing apparatus 300, which has the structure that has been described, are almost the same as the operations by the image compositing apparatus 100 in FIG. 11.

The operations by the image compositing apparatus 300 are different from those by the image compositing apparatus 100 in the following points.

The operation at step S1002 is performed by the EPG generating unit 2003. More specifically, the EPG generating unit 2003 informs the video reproducing unit 2001 of the positions and sizes of not one video image component but a plurality of video image components.

Also, the operation at step S1003 is performed by the sixth compositing unit 2004.

The operation at step S1004 is performed by the seventh compositing unit 2005. More specifically, the seventh compositing unit 2005 calculates the composite α values for each of the plurality of video image components and stores the calculated composite α values on the video plane 2002.

Furthermore, the operation at step S1005 is performed by the video reproducing unit 2001. More specifically, the video reproducing unit 2001 reproduces a plurality of video images and stores the reproduced video images on the video plane 2002.

The operation at step S1006 is performed by the eighth compositing unit 2006. More specifically, the eighth compositing unit 2006 adds the RGB components of the sixth composite image data to the RGB components of the plurality of video image components that have been weighted with the composite α values. Then, the eighth compositing unit 2006 outputs the RGB components of the composite image, which have been obtained by the addition, to the output unit 111 (step S1006).

The eighth compositing unit 2006 continues to composite the planes on the video plane 2002 with the OSD plane 107 and output the compositing result as has been described until stop instructions. The operations by the eighth compositing unit 2006 are performed in parallel with the operations by the video reproducing unit 2001, the sixth compositing unit 2004, and the seventh compositing unit 2005.

The Fourth Embodiment

<Structure>

Figure 22:
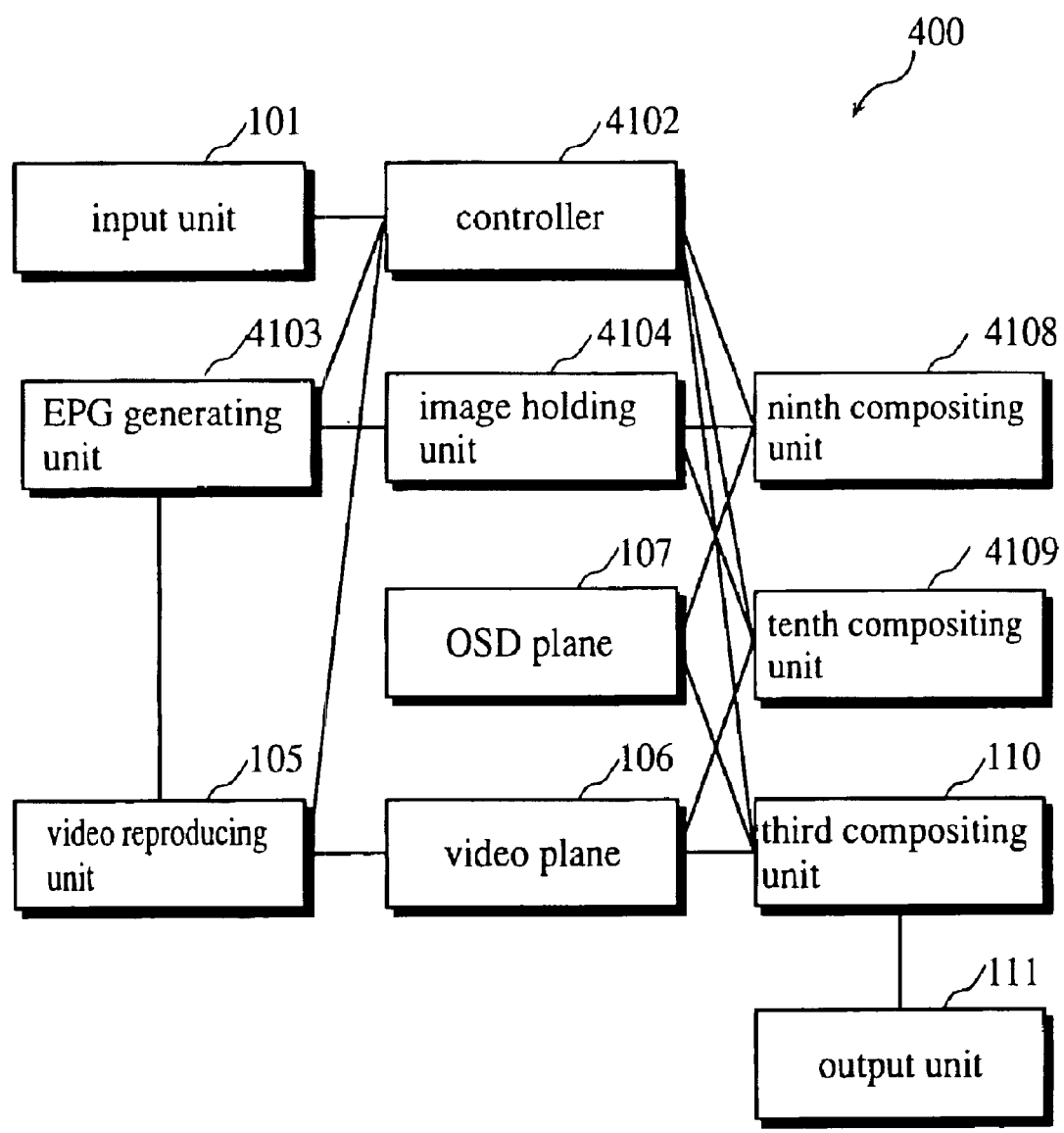
FIG. 22 is a block diagram showing the structure of an image compositing apparatus according to the fourth embodiment of the present invention.

FIG. 22 is a block diagram showing the structure of an image compositing apparatus according to the fourth embodiment of the present invention.

In FIG. 22, an image compositing apparatus 400 includes the input unit 101, a controller 4102, an EPG generating unit 4103, an image holding unit 4104, the video reproducing unit 105, the video plane 106, the OSD plane 107, a ninth compositing unit 4108, a tenth compositing unit 4109, the third compositing unit 110, and the output unit 111. The compositing apparatus 400 composites images according to the Porter-Duff rules. The Porter-Duff rules are described in T. Porter and T. Duff, "Compositing Digital Images", SIGGRAPH 84, 253–259, for instance. In this specification, the Porter-Duff rules will be described using FIGS. 3A and 3B as necessary.

Here, an overall explanation of the Porter-Duff rules will be given below.

According to the Porter-Duff rules, there are 12 compositing operations that can be used to combine source pixels and destination pixels. The source and destination pixels each has RGB components and an α value. Note that the α value is differently defined from the α value in the first to the third embodiments. The α value used in the first to third embodiments is defined between two images. In contrast, the α value used in the Porter-Duff rules in the present embodiment is an α value defined for each image. In the Porter-Duff rules an image which is the result of compositing two images which each have an α value also has an α value. When the image which is the result of compositing is actually displayed on the screen, a value, which is the RGB value and the α value multiplied together, is output.

The image compositing apparatus 400 of the present embodiment can use eight of the 12 compositing operations to composite images. The eight compositing operations are "CLEAR", "SRC", "SRC_OVER", "DST_OVER", "SRC_IN", "DST_IN", "SRC_OUT", and "DST_OUT".

In the "CLEAR" operation, both of the RGB components and the α values of the destination are cleared. Neither the source nor the destination is used as input. In the present embodiment, the destination corresponds to the image held on the OSD plane 107, while the source to the image of the image file "i".

In the "SRC" operation, the source is copied to the destination.

In the "SRC_OVER" operation, the source is composited over the destination.

In the "DST_OVER" operation, the destination is composited over the source and the result replaces the destination.

In the "SRC_IN" operation, the part of the source lying inside of the destination replaces the destination.

In the "DST_IN" operation, the part of the destination lying inside of the source replaces the destination.

In the "SRC_OUT" operation, the part of the source lying outside of the destination replaces the destination.

In the "DST_OUT" operation, the part of the destination lying outside of the source replaces the destination.

Here, an explanation of the elements different from the other embodiments will be given.

The controller 4102 controls all the elements of the image compositing apparatus 400. More specifically, when the user instructs to turn the image compositing apparatus 400 ON, the controller 4102 has the video reproducing unit 105 reproduce a program. When the user instructs to switch channels, the controller 4102 has the video reproducing unit 105 reproduce another program. When the user instructs to turn the EPG display ON, the controller 4102 controls the EPG generating unit 4103, the video reproducing unit 105, the ninth compositing unit 4108, the tenth compositing unit 4109, the third compositing unit 110, and the like so as to generate a composite image.

As in the case of the first embodiment, the EPG generating unit 4103 obtains the EPG information from the broadcasting station. Also, the EPG generating unit 4103 generates a plurality of image files and one index file according to the EPG information. The image files and the index file are stored in the image holding unit 4104.

Furthermore, the EPG generating unit 4103 extracts from the EPG information the size and position of the video image component that is to be composited into the EPG display image. The extracted size and position are output to the video reproducing unit 105.

The image holding unit 4104 holds a plurality of image files and one index file.

The index file, which is used for controlling the plurality of image files, includes a plurality of pieces of image information. Each piece of image information corresponds to a different image file. The plurality of pieces of image information are arranged in the index file in the same order as the overlaying order of components. Each piece of image information includes an image type, an operation type, and a storage position. The image type indicates whether the image of the corresponding image file is a graphical image or a video image. The operation type indicates which one of the 12 composition operations in the Porter-Duff rules is used. The storage position indicates the position of the beginning of the corresponding image file in the image holding unit 4104.

Figure 23:
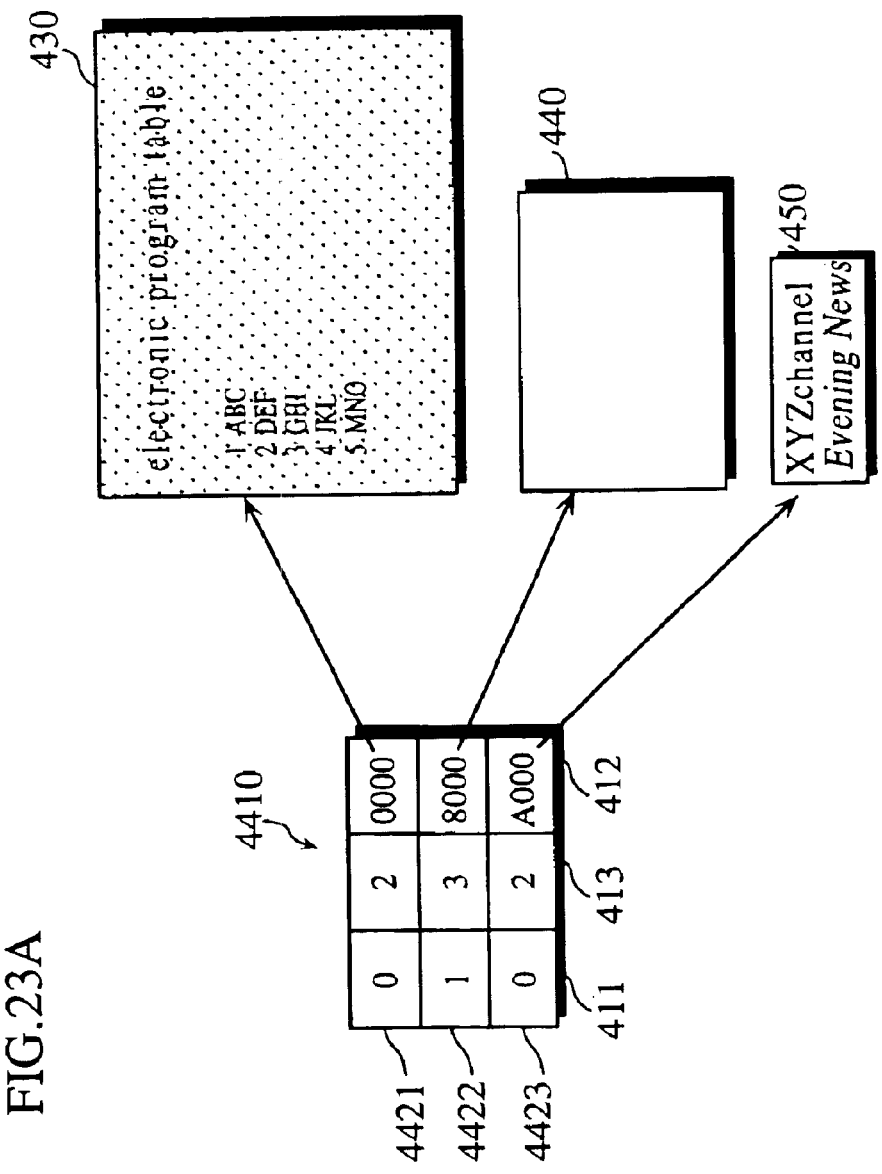
FIG. 23A shows an example of index file.
FIG. 23B shows the correspondence between the number and the operation type.

FIG. 23A shows an example of index file. FIG. 23B shows the correspondence between the number and the operation type. An index file 4410 in FIG. 23A includes image information 4421, 4422, and 4423. The image information 4422 is overlaid on the image information 4421, and the image information 4423 is overlaid on the image information 4422. More specifically, the image information 4421 corresponds to a component that is positioned at the lowest layer, the image information 4422 corresponds to a component at the next layer, and the image information 4423 corresponds to a component at the uppermost layer. The values in a column 411 indicate the image types of the components. More specifically, the value "0" indicates the graphical image, while the value "1" the video image. The values in a column 413 indicate the operation types. More specifically, the value "1" in the line 4422, column 413 indicates the "SRC_OVER" operation, and the value "2" in the line 4423, column 413 and in the line 4421, column 413 the "SRC" operation. The values in a column 412 indicates the storage positions.

Meanwhile, images 430, 440, and 450 correspond to the components 202, 203, and 204, respectively. The images 430, 440 and 450 show the image data in the corresponding image files in the form of image. Here, the image 440 shows that all the RGB components of the image data corresponding to the component 203 are "0". According to the Porter-Duff rules, α values are set for all the images. For this reason, any α values are set for the image 430 even though the image 430 corresponds to the component at the lowest layer.

The image holding unit 4104 holds the plurality of image files and the index file.

When receiving instructions from the controller 4102, the ninth compositing unit 4108 composites the image data of the plurality of image files held in the image holding unit 4104 to generate ninth composite image data. The ninth composite image data are stored on the OSD plane 107. This processing is referred to as the "ninth compositing processing" in this specification.

Figure 24:
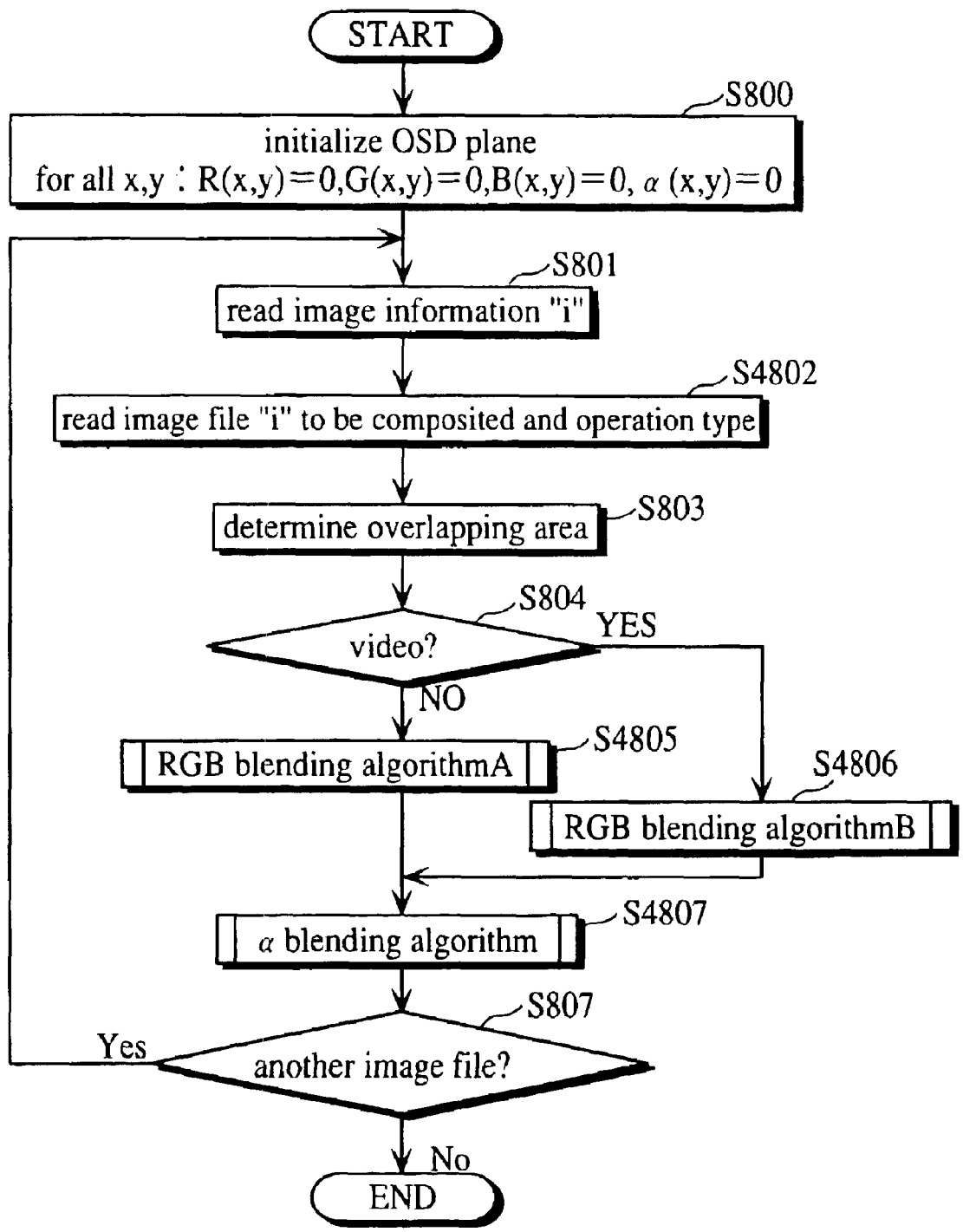
FIG. 24 is a flowchart showing ninth compositing processing.

FIG. 24 is a flowchart showing the ninth compositing processing.

In the flowchart in FIG. 24, the same operations as in FIG. 9 are performed at the steps that have the same reference numbers as in the flowchart in FIG. 9. The following explanation will be focused on the operations at the steps with different reference numbers.

At step S4802, the ninth compositing unit 4108 reads the image file "i" stored in the storage position indicated by the image information "i" and the operation type indicates by the image information "i".

At step S4805, the Porter-Duff rules shown in FIG. 25 is performed in pixel units according to the operation type read at step S4802.

At step S4806, the RGB components of the video image are sets as "0" and an operation shown in FIG. 26 is performed in pixel units according to the operation type.

At step 4807, an α value calculation as shown in FIG. 27 is performed in pixel units according to the operation type.

Note that eight among 12 compositing operations of the Porter-Duff rules are shown in FIGS. 25, 26, and 27.

When receiving instructions from the controller 4102, the tenth compositing unit 4109 generates the α values of the video plane 106 to the OSD plane 107 from the image data stored in the image holding unit 4104. The generated α values are stored on the video plane 106.

Figure 28:
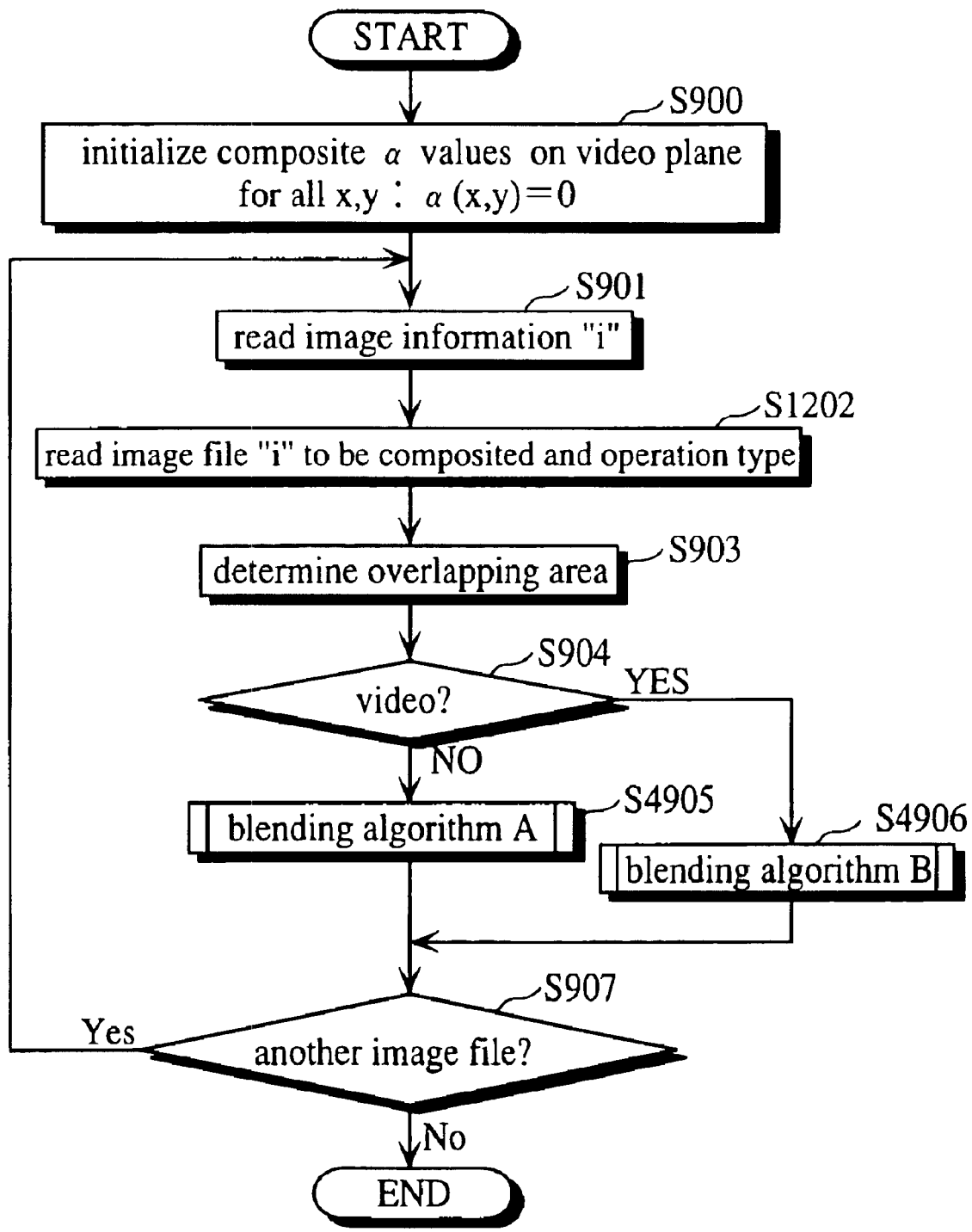
FIG. 28 is a flowchart showing tenth compositing processing.

FIG. 28 is a flowchart showing the compositing processing.

In the flowchart in FIG. 28, the same operations as in FIG. 10 are performed at the steps that have the same reference numbers as in the flowchart in FIG. 10. The following explanation will be focused on the operations at the steps with reference numbers different from the flowchart in FIG. 10.

At step S1202, the tenth compositing unit 4109 reads the image file "i" indicated by the image information "i" and the operation type indicates by the image information "i".

At step S4905, the tenth compositing unit 4109 performs an operation shown in FIG. 29 in pixel units according to the operation type that has been read at step S1202. A graphical image is overlaid on a video image in principle, so that the components of the video image are weakened. In FIG. 29, the value "α" indicates the α value of each of the pixels on the video plane 106, and the value "αi" indicates the α value of each of the pixels of the read image file that are overlaid on the video plane 106. Theoretically, the α value is "0" to "1". Actually, however, the α value is represented by a value "0" to "255" or "0" to "15".

At step S4906, the tenth compositing unit 4109 performs an operation shown in FIG. 30 in pixel units according to the operation type. Note that the ninth compositing unit 4108 operates in synchronization with the tenth compositing unit 4109. At steps S1202, S903, S904, and S907, the results at steps S4802, S803, S804, and S807 may be used. Also, the operations at steps S1202, S903, S904, and S907 may be performed in synchronization with the operations at steps S4802, S803, S804, and S807. Meanwhile, the operations at steps S4905 and 4906 need to be completed before the operation at step S807.

Accordingly, the image compositing apparatus 400 composites images according to the Porter-Duff rules with a small amount of memory and smaller number of multiplications as in the case of the first embodiment.

FIG. 31 shows a program for the arithmetic operations in the fourth embodiment of the present invention written in the form of the C language. This program focuses on one pixel. The letters "R", "G", "B", and "α" indicate the RGB components and the α value of one pixel on the OSD plane, and the letters "αv" indicate the α value of a corresponding pixel on the video plane.

The first to fifth lines indicate the initialization processing. The eighth, 11th, and 14th indicate operations performed by the ninth compositing unit 4108. Meanwhile, the ninth and 12th lines indicate arithmetic operations performed by the tenth compositing unit 4109. In the ninth and 12th lines, the contribution degree (the β value), i.e., the composite α value, is calculated. The 16th, 17th, and 18th lines indicate the arithmetic operations by the third compositing unit 110. Here, the 16th, 17th, and 18th lines may be performed by different threads in parallel. Also, the 18th to 20th lines may be an endless loop. More specifically, the arithmetic operation in the eighth line is shown in FIG. 26, and the arithmetic operation in the 11th line in FIG. 25. Meanwhile, the arithmetic operation in the ninth line is shown in FIG. 30, and the arithmetic operation in the 12th in FIG. 29. Here, the letter "α" in FIG. 29 corresponds to the letters "αv" in FIG. 31. More specifically, the arithmetic operation in the 14th line is shown in FIG. 27.

Accordingly, the image compositing apparatus 400 in the fourth embodiment composites a plurality of graphical images and calculates the composition ratio of a video image according to the operation type of the Porter-Duff rules designated for each of the images. Then, the image compositing apparatus 400 composites each of the frames of the video image with the composite graphical image according to the operation type. By doing so, the plurality of graphical images need not to be composited-with a frame of the video image whenever the video image frame is updated. As a result, the calculation is performed under light load and the processing speed is increased. As a result of the higher processing speed, images are composited and composite image is displayed in real time according to the reproduction rate of the video image. Accordingly, every time one frame is developed in the frame buffer, the frame is composited with composite graphical image due to the real time image composition. As a result, the capacity of the frame buffer for developing video image frames can be decreased. This is effective.

While an explanation of the image compositing apparatus according to the present invention has been given, other possible modifications will be given below.

(1) In the first and second embodiments, the composite α values of the video image component are stored on the video plane 106. When the number of video image component is one, however, the composite α values of the video image component may be stored on the OSD planes 107 and 1501.

(2) In the first to fourth embodiments, the pixel data are stored in the memory and the like in the order of R, G, B, and α. The pixel data, however, can be stored in a different order, for instance, the order of α, R, G, and B, or α, B, G, and R. Also, the components R, G, B, and α can be stored in component units instead of pixel units.

(3) The data length of each of the components R, G, B, and α is one byte. Accordingly, the RGB components each have gradation values out of 256 gradation values, i.e., "0" to "255". In total, the RGB components express about 16,700,000 colors. The data length, however, can be four bits, i.e., so-called, "high color".

(4) In the first to fourth embodiments, YUV components can be used instead of RGB components.

(5) The image holding units 104 and 4104 hold pixel data as the image data of the graphical image components in the preferred embodiments. Instead, the image holding units 104 and 4104 can hold vector data, i.e., data composed of expressions and graphics such as straight line, dot, and circle to develop the vector data into pixel data when the first compositing unit 108 composites image data together. By doing so, the memory capacity can be decreased.

(6) The operational procedure of the image compositing apparatus 100, 200, 300, and 400 can be a computer program executed by a general-purpose computer or an apparatus having a function of executing a program.

Especially, a computer program corresponding to the image compositing apparatus 400 is effective for eliminating the need for eight kinds of operational circuit corresponding to the eight kinds of operation of the Porter-Duff rules. Also, the computer program is effective for having one processor that executes the computer program carry out all the eight kinds of operation.

Furthermore, the computer program can be distributed by being recorded on a recording medium or through a variety of communication channels and the like. The recording medium includes the IC card, the optical disc, the flexible disk, the ROM, and the like.

(7) The third compositing unit 110 is constructed to perform the aforementioned addition for each frame in video reproduction, in other words to perform addition in synchronization with playback of frames, however, the third compositing unit 110 noes not have to be synchronous, but may be asynchronous. The same applies to the fifth compositing unit 1503 and the eighth compositing unit 2006.

Industrial Applicability

The present invention relates to an image display apparatus that composites and outputs a plurality of images together, and can be used particularly in a television that receives digital broadcasts.

What is claimed is:

1. An image compositing apparatus that composites images together into a final composite image, the images including a video image and a plurality of graphical images, the image compositing apparatus comprising:

first obtaining unit to obtain the graphical images and composition information including an image compositing order, the composition information being used for calculating a composition ratio of each of the images to the final composite image, the composition information further includes a composition coefficient for each of the images, each composition coefficient indicating a composition ratio of one of the images to a composite of the image with at least another one of the images;

first compositing unit that composites the graphical images to generate one composite graphical image according to the composition information;

calculating unit that calculates a composition ratio of the video image to the final composite image according to the composition information;

second obtaining unit that obtains frames of the video image;

second compositing unit that composites one of the obtained frames at a time with the composite graphical image using the composition ratio of the video image, wherein the image compositing order indicates a first overlaying order of the images, the composition coefficients are α values, each of which indicates a composition ratio of one of the images to a composite of the image with images below the image in the first overlaying order, and the calculating unit calculates the composition ratio of the video image to the final composite image from α values of the video image and images above the video image in the first overlaying order;

switching unit for two adjacent images in the first overlaying order to rearrange the images in a second overlaying order; and updating unit for updating α values of the switched two adjacent images so that results of compositing in the first and second overlaying orders are the same, wherein the first compositing unit generates the composite graphical image, the calculating unit calculates the composition ratio of the video image to the final composite image, and the second compositing unit composites the frames with the composite graphical image using the second overlaying order and the updated α values.

2. The image compositing apparatus of claim 1, wherein the composition information further includes arithmetic information which has blending algorithms which each correspond to the images, the blending algorithms using the composition coefficients.

3. The image compositing apparatus of claim 2, further comprising a first frame buffer that stores images, and a second frame buffer that stores frames of the video image, wherein
the first compositing unit reads the graphical images obtained by the first obtaining unit, according to the image compositing order, composites each of the read graphical images with a storage content of the first frame buffer using the coefficients and the arithmetic information, and replaces the storage content of the first buffer with a result of compositing one of the read graphical images with the storage content,
the second obtaining unit stores the obtained frames in the second buffer, and
the second compositing unit composites each of the frames stored in the second buffer with an image in the first frame buffer using the composition ratio of the video image.

4. The image compositing apparatus of claim 3, wherein the first compositing unit performs a blending algorithm on the image in the first frame buffer using a coefficient and arithmetic information corresponding to the video image after compositing a graphical image immediately preceding the video image in the compositing order and before compositing a graphical image immediately succeeding the video image with the storage content, and replaces the content of the first frame buffer with a result of the blending algorithm.

5. The image compositing apparatus of claim 3, further comprising a display screen, wherein
the first compositing unit generates the composite graphical image, the second obtaining unit obtains the frames, and the second compositing unit composites the frames with the composite graphical image in parallel with each other.

6. The image compositing apparatus of claim 1, wherein the two adjacent images are images "i" and "i+1" that are each "i"th and "i+1"th images from a bottom of the first overlaying order, and
the updating unit sets α values of the images "i+1" and "i" as $\alpha[i]*(1-\alpha[i+1])$ and $\alpha[i+1]/(1-\alpha[i]*(1-\alpha[i+1]))$, respectively.

7. The image compositing apparatus of claim 1, further comprising a storage unit for storing a plurality of graphical images that are obtained by the first obtaining unit, wherein
the graphical images are each made up of (A) image data which has pixels, a number of which is no larger than pixels of the final composite image and (B) layout information which indicates a layout of the images on the final composite image, and
the first compositing unit generates the composite graphical image, the calculating unit calculates the composition ratio of the video image to the final composite image, and the second compositing unit composites the frames with the composite graphical image for an overlapping part of the images that is determined by the layout information.

8. The image compositing apparatus of claim 1, further comprising a storage unit for storing the plurality of graphical images obtained by the first obtaining unit;
the plurality of graphical images are represented by vector data; and
the first compositing unit generates the composite graphical image after converting the vector data to the pixels.

9. A computer-readable recording medium storing a program that has a computer composite images together into a final composite image, the images including a video image and a plurality of graphical images, the program comprising:
a first obtaining step for obtaining the graphical images and composition information that includes an image compositing order, the composition information being used for calculating a composition ratio of each of the images to the final composite image;
the composition information further includes a composition coefficient for each of the images, each composition coefficient indicating a composition ratio of one of the images to a composite of the image with at least another one of the images;
a first compositing step for compositing the graphical images to generate one composite graphical image according to the composition information;
a calculating step for calculating a composition ratio of the video image to the final composite image according to the composition information;
a second obtaining step for obtaining frames of the video image;
a second compositing step for compositing one of the obtained frames at a time with the composite graphical image using the composition ratio of the video image;
wherein the image compositing order indicates a first overlaying order of the images, the composition coefficients are α values, each of which indicates a composition ratio of one of the images to a composite of the image with images below the image in the first overlaying order, and the calculating step calculates the composition ratio of the video image to the final composite image from α values of the video image and images above the video image in the first overlaying order;
a switching step for rearranging two adjacent images in the first overlaying order into a second overlaying order; and
an updating step for updating α values of the switched two adjacent images so that results of compositing in the first and second overlaying orders are the same, wherein
the first compositing step generates the composite graphical image, the calculating step calculates the composition ratio of the video image to the final composite image, and the second compositing step composites the frames with the composite graphical image using the second overlaying order and the updated α values.

10. A program that has a computer composite images together into a final composite image, the images including a video image and a plurality of graphical images, the program comprising:
a first obtaining step for obtaining the graphical images and composition information that includes an image compositing order, the composition information being used for calculating a composition ratio of each of the images to the final composite image;

the composition information further includes a composition coefficient for each of the images, each composition coefficient indicating a composition ratio of one of the images to a composite of the image with at least another one of the images;

a first compositing step for compositing the graphical images to generate one composite graphical image according to the composition information;

a calculating step for calculating a composition ratio of the video image to the final composite image according to the composition information;

a second obtaining step for obtaining frames of the video image;

a second compositing step for compositing one of the obtained frames at a time with the composite graphical image using the composition ratio of the video image;

wherein the image compositing order indicates a first overlaying order of the images, the composition coefficients are $\alpha$ values, each of which indicates a composition ratio of one of the images to a composite of the image with images below the image in the first overlaying order, and the calculating step calculates the composition ratio of the video image to the final composite image from $\alpha$ values of the video image and images above the video image in the first overlaying order;

a switching step for rearranging two adjacent images in the first overlaying order into a second overlaying order; and an updating step for updating $\alpha$ values of the switched two adjacent images so that results of compositing in the first and second overlaying orders are the same, wherein the first compositing step generates the composite graphical image, the calculating step calculates the composition ratio of the video image to the final composite image, and the second compositing step composites the frames with the composite graphical image using the second overlaying order and the updated $\alpha$ values.

* * * * *